US010016330B2

(12) United States Patent
Endo

(10) Patent No.: US 10,016,330 B2
(45) Date of Patent: Jul. 10, 2018

(54) STEP ASSIST DEVICE, AND COMPUTER-READABLE MEDIUM HAVING STORED THEREON A STEP COUNT PROGRAM

(71) Applicant: HONDA MOTOR CO., LTD., Minato-Ku, Tokyo (JP)

(72) Inventor: Yosuke Endo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 461 days.

(21) Appl. No.: 14/736,490

(22) Filed: Jun. 11, 2015

(65) Prior Publication Data
US 2015/0366738 A1 Dec. 24, 2015

(30) Foreign Application Priority Data
Jun. 19, 2014 (JP) .................... 2014-126167

(51) Int. Cl.
A61H 3/00 (2006.01)
A61H 1/02 (2006.01)
G05B 15/02 (2006.01)

(52) U.S. Cl.
CPC ............ A61H 3/00 (2013.01); A61H 1/0244 (2013.01); G05B 15/02 (2013.01); A61H 2201/1215 (2013.01); A61H 2201/164 (2013.01); A61H 2201/165 (2013.01); A61H 2201/1628 (2013.01); A61H 2201/5069 (2013.01); A61H 2201/5097 (2013.01)

(58) Field of Classification Search
CPC ................ A61H 3/00; A61H 1/0244; A61H 2201/5097; A61H 2201/165; A61H 2201/1628; A61H 2201/1215; A61H 2201/164; A61H 2201/5069; G05B 15/02
See application file for complete search history.

(56) References Cited

U.S. PATENT DOCUMENTS

2009/0270766 A1  10/2009  Yasuhara
2010/0049102 A1*  2/2010  Yasuhara ............. A61H 1/0244
                                                              601/5
2010/0132464 A1*  6/2010  Yasuhara ............. A61B 5/1038
                                                              73/504.12
2011/0288453 A1*  11/2011  Endo .................... A61H 1/0244
                                                              601/35

(Continued)

FOREIGN PATENT DOCUMENTS

JP        2013111408 A      6/2013

OTHER PUBLICATIONS

German Office Action dated May 3, 2016 with English translation for corresponding German File No. 10 2015 211 257.8.

Primary Examiner — Sundhara Ganesan

(57) ABSTRACT

Provided is a step assist device including a first phase angle modifying section that, according to repetition of the step movement, modifies in a staged manner the phase angle input thereto, based on a predetermined phase change pattern, such that a phase pattern of the phase angle approaches a straight line relative to the passage of time, and outputs the modified phase angle as a first modified phase angle. The control section acquires a target value based on a continuous change pattern of the auxiliary force set in advance for at least one of the first modified phase angle and a prescribed phase angle, and controls the providing section according to the target value.

10 Claims, 18 Drawing Sheets

(56) References Cited

U.S. PATENT DOCUMENTS

2012/0226203 A1    9/2012  Nakashima et al.
2013/0138020 A1    5/2013  Yasuhara
2015/0327796 A1*  11/2015  Hashimoto ............ A61H 1/024
                                                            600/595

* cited by examiner

US 10,016,330 B2

STEP ASSIST DEVICE, AND COMPUTER-READABLE MEDIUM HAVING STORED THEREON A STEP COUNT PROGRAM

The content of the following Japanese application is incorporated herein by reference:
NO. 2014-126167 filed on Jun. 19, 2014.

BACKGROUND

1. Technical Field

The present invention relates to a step assist device and a computer-readable medium having stored thereon a step count program.

2. Related Art

In a conventional step assist device, assistance torque is generated using a first phase oscillator based on a period of the hip joint angle of an assisted walker and a second phase oscillator based on deviation between left and right hip joint angles, in order to balance the movement period of the step assist device and the walking step period of the assisted walker, as shown in Patent Document 1, for example.
Patent Document 1: Japanese Patent Application Publication No. 2013-111408

However, the step assist device described above balances the movement period with the step period of the assisted walker, and does not correct the phase angle determined by the periodic movement of the hip joints, and therefore there is a problem that changes in the phase angle relative to the step period are easily disturbed.

SUMMARY

According to a first aspect of the present invention, provided is a step assist device comprising a providing section that provides auxiliary force to a periodic step movement of a user; a control section that controls movement of the providing section; a detecting section that detects at least one of a hip joint angle and a hip joint angular speed of the user; and a calculating section that calculates a phase angle defined relative to periodic movement of a hip joint of the user, based on a detection result of the detecting section. The step assist device further comprises a first phase angle modifying section that, according to repetition of the step movement, modifies in a staged manner the phase angle input thereto, based on a predetermined phase change pattern, such that a phase pattern of the phase angle approaches a straight line relative to the passage of time, and outputs the modified phase angle as a first modified phase angle, and the control section acquires a target value based on a continuous change pattern of the auxiliary force set in advance for at least one of the first modified phase angle and a prescribed phase angle, and controls the providing section according to the target value.

According to a second aspect of the present invention, provided is a computer-readable medium storing thereon a step count program that, when executed by a computer, causes the computer to detect at least one of a hip joint angle and a hip joint angular speed of a user; calculate a phase angle defined relative to periodic movement of a hip joint of the user, based on a detection result of the detecting; according to repetition of the step movement, modify in a stepped manner an input phase angle input, based on a predetermined phase change parameter, such that a phase pattern of the phase angle approaches a straight line relative to the passage of time, and output the modified phase angle as a first modified phase angle, and acquire a target value for an auxiliary force of a providing section that provides the auxiliary force for the step movement, based on a continuous change pattern of the auxiliary force set in advance for at least one of the first modified phase angle and a prescribed phase angle; and control the providing section according to the target value.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
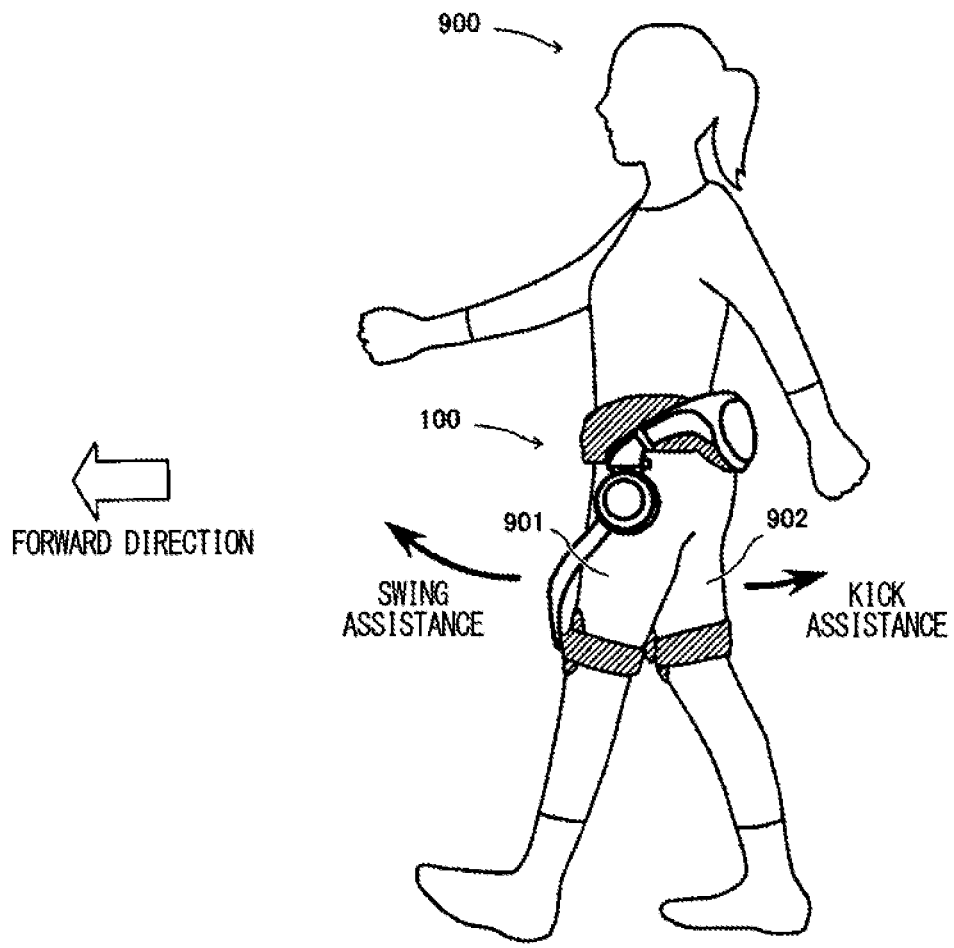
FIG. 1 is a view for describing a usage state of a step assist device according to the present embodiment.

FIG. 1 is a view for describing a usage state of a step assist device 100 according to the present embodiment. A user 900 attaches and secures the step assist device 100 to the waist and leg regions. The step movement of a person generally includes alternating repetition of a movement of kicking out the pivot leg and a movement of swinging forward the other leg. For example, as shown in the drawing, when the right leg is the pivot leg and the left leg is swung, the step assist device 100 assists with the kicking by applying a backward auxiliary force to the right thigh 902 and assists with the swinging by applying a forward auxiliary force to the left thigh 901. On the other hand, when the left leg is the pivot leg and the right leg is swung, the step assist device 100 assists with the kicking by applying a backward auxiliary force to the left thigh 901 and assists with the swinging by applying a forward auxiliary force to the right thigh 902. By repeating the assistance movement, the step assist device 100 can provide an auxiliary force for forward progression, thereby enabling the user 900 to walk comfortably.

The step assist device 100 is not limited to use by an able-bodied person. The step assist device 100 is also used by patients in rehabilitation who are training to recover their normal walking ability. For example, a rehabilitation patient who has suffered partial paralysis as the result of a stroke is prone to stumble when walking, due to a decrease in the knee joint angle during the swing phase, which is the interval during which the leg swings, and this is known to cause gait problems such as pulling up on the pelvis. The step assist device 100 can increase the knee joint angle by providing swing assistance, and is therefore suitable for use in rehabilitation after a stroke. Accordingly, the step assist device 100 can rectify the gait at an early stage and in a manner appropriate for the state of the rehabilitation patient. Furthermore, as another aspect, the step assist device 100 can decrease the physical exertion of a physical therapist who would have, up to this point, been giving rehabilitation treatment by moving while supporting the legs of the rehabilitation patient.

In addition, the step assist device 100 is not limited to being used by people, and can be applied to animals and machines. The step assist device 100 is not limited to providing assistance, and can also operate to provide resistance. In other words, the step assist device 100 can generate a resistance force that applies a backward auxiliary force against the swinging movement and a forward auxiliary force against the kicking movement of the user 900. By operating in this manner, the step assist device 100 can be used as a training device to for strength training by an athlete, for example.

The present embodiment describes a case in which the auxiliary force is applied for assistance. The following provides a detailed description of the step assist device 100.

Figure 2:
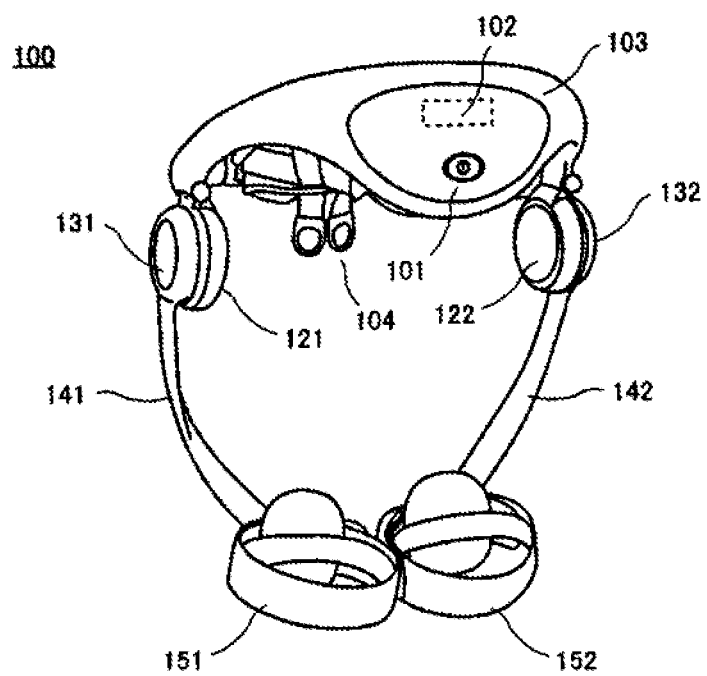
FIG. 2 is an external perspective view of the step assist device.

FIG. 2 is an external perspective view of the step assist device 100. The step assist device 100 includes a waist frame 103 that presses against the sides of the waist region from the back of the waist region of the user 900. The waist frame 103 is formed from a highly rigid material such as a light-weight alloy, e.g. aluminum, resin, e.g. polycarbonate, or carbon fiber. An activation switch 101 is provided near the center of the back surface of the waist frame 103, and the step assist device 100 can be made to operate when the user 900 presses the switch. Furthermore, the step assist device 100 can be made to stop when the switch is pressed once again.

A battery 102, which supplies electrical power to the step assist device 100, is arranged in an attachable manner on the back surface of the waist frame 103. The battery 102 may be a lithium ion battery with an output voltage of approximately 20 V, for example.

A waist belt 104 is connected to the ends of the waist frame 103. The waist belt 104 is wound around the waist of the user 900 together with the waist frame 103, and is fastened on the stomach surface side. The waist belt 104 is formed by a soft material such as a textile material. In this way, by using the waist frame 103 and the waist belt 104, the step assist device 100 is securely fastened to the user 900.

A left motor 121 and a right motor 122, which are each an example of an actuator, are arranged on both of the waist side surfaces of the waist frame 103. The left motor 121 and the right motor 122 are motors with the same specifications, and are DC motors having an output capability with a maximum torque of 4 N·m, for example. The left motor 121 rotates a left thigh frame 141 relative to the waist frame 103. The left thigh frame 141 is provided with a left angle sensor 131 that detects the rotational speed and rotational angle of the output rotation axis of the left motor 121. In the same manner, the right motor 122 rotates a right thigh frame 142 relative to the waist frame 103. The right thigh frame 142 is provided with a right angle sensor 132 that detects the rotational speed and rotational angle of the output rotation axis of the right motor 122. The left angle sensor 131 and the right angle sensor 132 are rotary encoders, for example.

The left thigh frame 141 and the right thigh frame 142 are formed from a highly rigid material such as a light-weight alloy, e.g. aluminum, resin, e.g. polycarbonate, or carbon fiber, in the same manner as the waist frame 103. A left thigh belt 151 is attached to the left thigh frame 141 on another end thereof that is opposite the one end to which the left motor 121 is connected. The user 900 winds and secures the left thigh belt 151 around the thigh of the left leg near the knee. In the same manner, a right thigh belt 152 is attached to the right thigh frame 142 on another end thereof that is opposite the one end to which the right motor 122 is connected. The user 900 winds and secures the right thigh belt 152 around the thigh of the right leg near the knee. The left thigh belt 151 and the right thigh belt 152 are formed of a soft material, such as a textile material.

With the step assist device 100 configured in this manner, when the left motor 121 is not being powered, the left angle sensor 131 can detect the rotational angle of the left thigh 901 during the step movement of the user 900 by their own strength. When the left motor 121 is powered and rotates forward, the left motor 121 rotates the left thigh frame 141 in the swinging direction, and as a result generates an auxiliary force that lifts the thigh of the left leg forward. When the left motor 121 is powered and rotates backward, the left motor 121 rotates the left thigh frame 141 in the kicking direction, and as a result generates an auxiliary force that presses the thigh of the left leg downward. The left angle sensor 131 also detects the rotational angle of the left thigh 901 when the left motor 121 is being powered.

In the same manner, when the right motor 122 is not being powered, the right angle sensor 132 can detect the rotational angle of the right thigh 902 during the step movement of the user 900 by their own strength. When the right motor 122 is powered and rotates backward, the right motor 122 rotates the right thigh frame 142 in the swinging direction, and as a result generates an auxiliary force that lifts the thigh of the right leg forward. When the right motor 122 is powered and rotates forward, the right motor 122 rotates the right thigh frame 142 in the kicking direction, and as a result generates an auxiliary force that presses the thigh of the right leg downward. The right angle sensor 132 also detects the rotational angle of the right thigh 902 when the right motor 122 is being powered.

Figure 3:
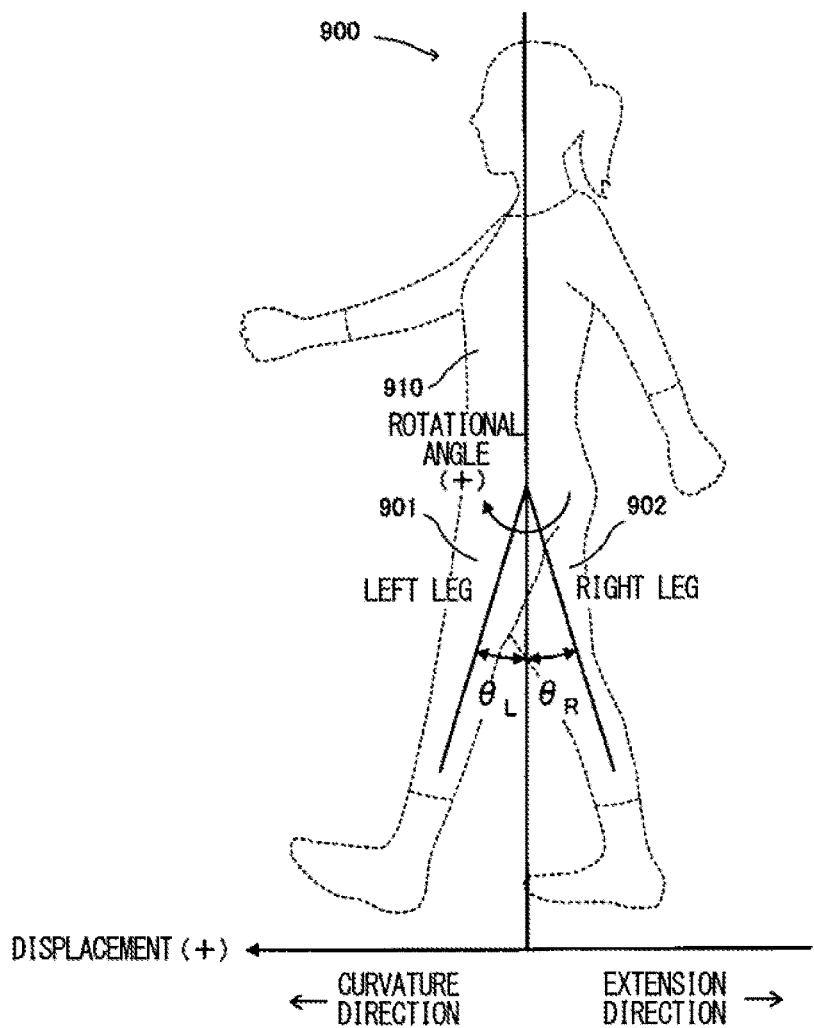
FIG. 3 is a view for describing the definition of the rotational angle and the movement of the user.

FIG. 3 is a view for describing the definition of the rotational angle and the movement of the user 900. In the following description, values corresponding to the right leg are indicated by an R appended in the bottom right, and values corresponding to the left leg are indicated by an L appended in the bottom right. Values without any appended characters are values that correspond to both the right leg and the left leg.

As shown in FIG. 3, the direction of the displacement occurring when the user 900 progresses forward is set as the positive direction. During the swinging movement, the thighs are relatively close the upper body 910, and this is referred to as curvature movement. During curvature movement, the displacement direction is the positive direction. Furthermore, with a center line along the weight direction of the upper body 910 serving as a base line, the line portion along a thigh and having a hip joint as one end forms a positive rotation angle relative to the base line. In the drawing, the left leg is in the midst of the swinging movement, and the left hip join angle $\theta_L$, which is the angle formed by the line portion along the left thigh 901 relative to the base line, has a positive value.

During the kicking movement, the thighs are relatively far from the upper body 910, and this is referred to as extension movement. During extension movement, the displacement direction is the negative direction. Furthermore, the line portion along the thigh with the hip joint as one end forms a negative rotational angle relative to the base line. In the drawing, the right leg is in the midst of the kicking movement, and the right hip join angle $\theta_R$, which is the angle formed by the line portion along the right thigh 902 relative to the base line, has a negative value.

Figure 4:
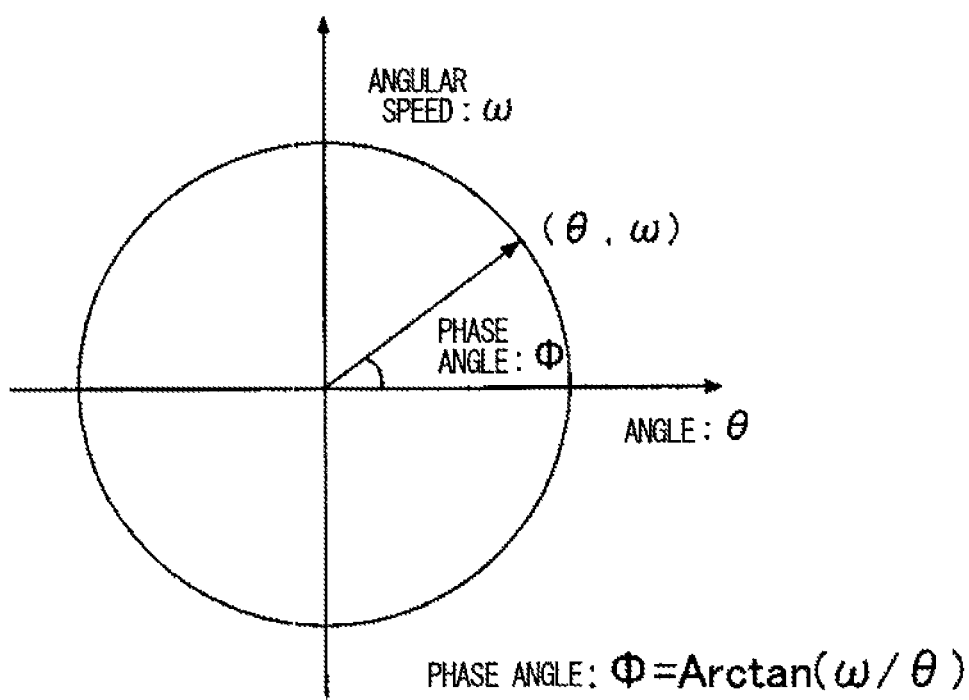
FIG. 4 shows the basics of the phase conversion process.

The following describes the phase angle defined relative to the periodic movement of the hip joints of the user 900. FIG. 4 shows the basics of the phase conversion process. As shown in FIG. 4, the phase angle $\varphi$ is defined as the inverse tangent of the ratio of the hip joint angular speed $\omega$ to the hip joint angle $\theta$, for example. In other words, the phase angle $\varphi$ is calculated according to Expression 1 shown below.

phase angle $\varphi=\text{Arctan}(\omega/\varphi)$   Expression 1:

FIGS. 5A to 5D are views for describing each signal waveform in the phase conversion process. The phase conversion process is the same for the right leg and the left leg, and therefore the description using FIGS. 5A to 5D deals only with the phase conversion process for the left leg, and the description of the phase conversion process for the right leg is omitted.

Figure 5A:
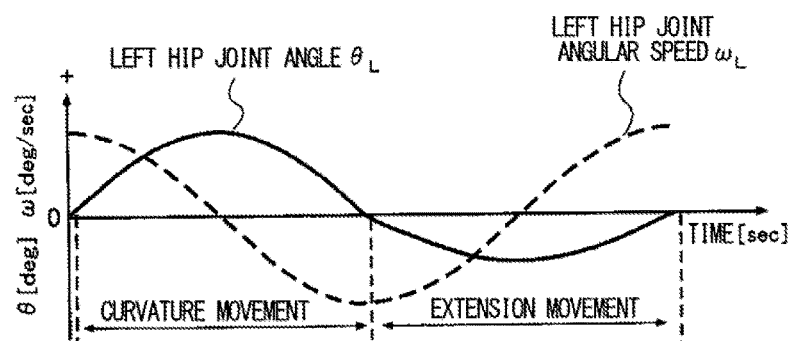
FIGS. 5A to 5D are views for describing each signal waveform in the phase conversion process.

FIG. 5A shows a signal waveform representing an example of the left hip joint angle $\theta_L$ and a signal waveform representing an example of the left hip joint angular speed $\omega_L$ in a case where the left leg of the user 900 performs curvature movement and then performs extension movement. In the signal waveforms shown in FIG. 5A, the vertical axis indicates the angle [deg] or the angular speed [deg/sec] and the horizontal axis indicates time [sec].

Figure 5B:
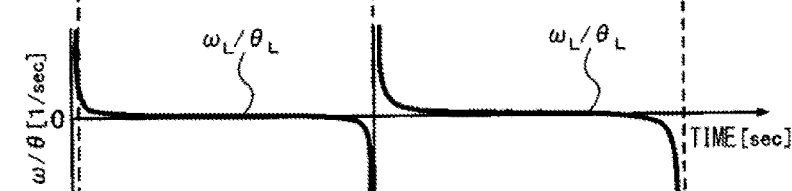

FIG. 5B shows the signal waveform of $\omega/\theta$. In the signal waveform shown in FIG. 5B, the vertical axis indicates $\omega/\theta$ [1/sec] and the vertical axis indicates time [sec]. The value of $\omega/\theta$ is calculated by dividing the value of the left hip joint angular speed $\omega_L$ by the value of the left hip join angle $\theta_L$.

Figure 5C:
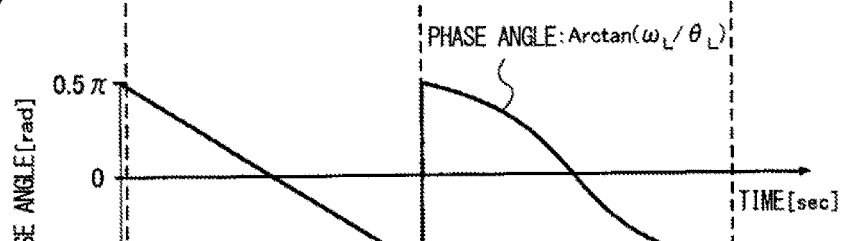

FIG. 5C shows the signal waveform of Arctan $(\omega/\theta)$. In the signal waveform shown in FIG. 5C, the vertical axis indicates the phase angle [rad] and the horizontal axis indicates time [sec]. The phase angle $\varphi$ is calculated as Arctan$(\omega/\theta)$. In this case, the phase angle $\varphi$ calculated during the curvature movement exhibits a value in a range from $-0.5\pi$ to $+0.5\pi$, and in the same manner, the phase angle $\varphi$ calculated during the extension movement exhibits a value in a range from $-0.5\pi$ to $+0.5\pi$.

Figure 5D:
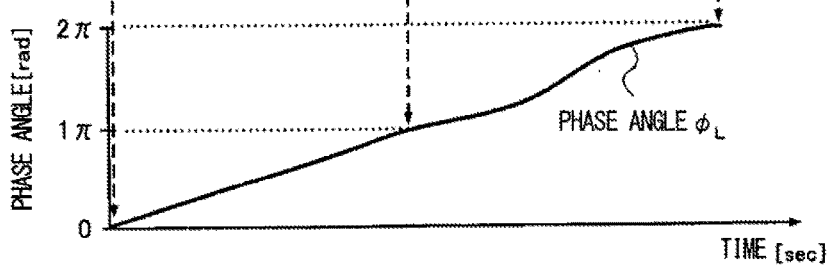

FIG. 5D shows the signal waveform obtained by correcting the signal waveform of Arctan$(\omega/\theta)$. In the signal waveform shown in FIG. 5D, the vertical axis indicates the phase angle [rad] and the horizontal axis indicates time [sec].

In the present embodiment, the phase indicating the state of each leg during a single step movement that includes one set having both the curvature movement and the extension movement is expressed by a period with a phase angle from 0 to $2\pi$. The correction method, which corrects the value of Arctan$(\omega/\theta)$ of the movement including one set of the curvature movement and the extension movement to be a phase angle with a period from 0 to $2\pi$, is different depending on the state of the leg for which the phase angle is 0. In the present embodiment, as an example, the state before the curvature movement is performed in which the base line and the left leg are aligned is set as having a phase angle 0, and the value of Arctan$(\omega/\theta)$ is corrected such that the phase angle is $2\pi$ in the state after the extension movement is performed in which the base line and the left leg are again aligned. In other words, with the point in time when the base line and the left leg are aligned and the left hip joint angular speed $\omega_L$ is positive being the state in which the base line and the left leg are aligned before the curvature movement is performed, Expression 1 is corrected to be Expression 2 such that the phase angle in this state becomes 0.

phase angle $\varphi=\text{Arctan}(\omega/\theta)+0.5\pi$   Expression 2:

While the user 900 performs the curvature movement and the left hip joint angle $\theta_L$ is positive, the phase angle $\varphi$ is calculated using Expression 2.

With the point in time when the base line and the left leg are aligned and the left hip joint angular speed $\omega_L$ is negative being the state in which the base line and the left leg are aligned before the extension movement is performed, Expression 1 is corrected to be Expression 3 such that the phase angle in this state becomes $\pi$.

phase angle $\varphi=\text{Arctan}(\omega/\theta)+1.5\pi$   Expression 3:

While the user 900 performs the extension movement and the left hip joint angle $\theta_L$ is negative, the phase angle $\varphi$ is calculated using Expression 3. When the user 900 continues performing the curvature movement and the extension movement, the left phase angle $\varphi_L$ for the next period is calculated by again using Expression 2 and Expression 3. In this way, the left phase angle $\varphi_L$ is calculated from the left hip joint angle $\theta_L$ and the left hip joint angular speed $\omega_L$ of the user 900.

Figure 6:
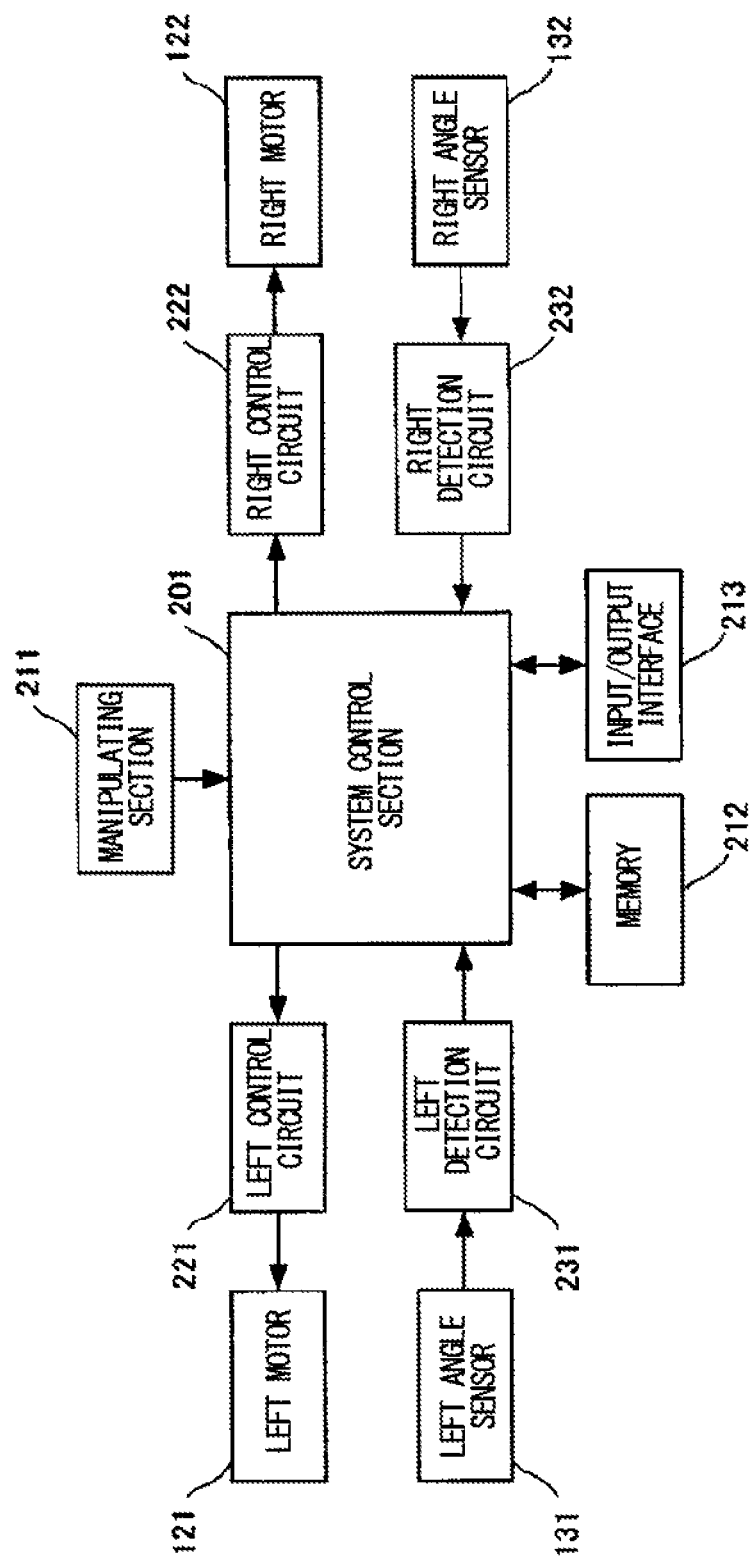
FIG. 6 is an element block diagram for describing each control element forming the step assist device.

The following describes each control element forming the step assist device 100. FIG. 6 is an element block diagram for describing each control element forming the step assist device 100. As shown in the drawing, each control element forming the step assist device 100 performs at least one of input and output either directly or indirectly with the system control section 201. In other words, the system control section 201 acting as a CPU that executes a preset program performs overall control of these control elements.

The system control section 201 controls the left motor 121 via a left control circuit 221. In the same manner, the system control section 201 controls the right motor 122 via a right control circuit 222. Specifically, after the assist torque value for assisting the left leg is calculated, the system control section 201 provides the left control circuit 221 with calculation results at a timing for generating this assisting auxiliary force, and after the assist torque value for assisting the right leg is calculated, the system control section 201 provides the right control circuit 222 with calculation results at a timing for generating this assisting auxiliary force. The left control circuit 221 and the right control circuit 222 each generate an analog drive voltage according to the provided assist torque values, and respectively apply this drive voltage to the left motor 121 and the right motor 122. In other words, the left control circuit 221 and the right control circuit 222 have amplification circuits including DA converters.

The system control section 201 receives a detection result of the left angle sensor 131 via a left detection circuit 231. In the same manner, the system control section 201 receives a detection result of the right angle sensor 132 via a right detection circuit 232. Specifically, the left angle sensor 131 is made to continuously generate a voltage pulse according to the rotational angle of the left thigh 901. The left detection circuit 231 counts this voltage pulse to convert the voltage pulse into a rotation angle per unit time, and provides the system control section 201 with this rotational angle as a digital value per unit time. Furthermore, the left detection circuit 231 can detect the left hip joint angular speed by dividing the rotation angle per unit time by the unit time. The left detection circuit 231 provides the system control section 201 with the left hip joint angular speed as well.

In the same manner, the right angle sensor 132 is made to continuously generate a voltage pulse according to the rotational angle of the right thigh 902. The right detection circuit 232 counts this voltage pulse to convert the voltage pulse into a rotation angle per unit time, and provides, per unit time, the system control section 201 with this rotational angle as a digital value. Furthermore, the right detection circuit 232 can detect the right hip joint angular speed $\omega_R$ by dividing the rotation angle per unit time by the unit time. The right detection circuit 232 provides the system control section 201 with the right hip joint angular speed as well.

The manipulating section 211 is a manipulation component for receiving instructions from the user 900, and includes the activation switch 101. In FIG. 2, the manipulating section 211 is represented by only the activation switch 101, but a manipulation component such as controls for receiving an auxiliary force adjustment may be included. The system control section 201 may perform each type of control according to changes in the manipulation component detected by the manipulating section 211.

The memory 212 is a storage apparatus using a flash memory, such as an SSD, and stores the programs executed by the system control section 201, various parameter values, and the like in a manner to not be lost when the power supply is turned off. The memory 212 also functions as a work memory that temporarily stores values generated by the calculations performed by the system control section 201. In the present embodiment, the memory 212 stores phase patterns and a torque table, for example, formed from the phase angles φ corrected by the system control section 201 and the modified phase angles φ in one period. The memory 212 may be formed from a plurality of types of memories that are physically isolated, according to the use of each memory. The memory 212 is an example of a storage section.

The input/output interface 213 includes a communicating section that performs input and output with an external device. For example, when the step assist device 100 is connected to a smart phone as the external device, the input/output interface 213 receives setting content set by the smart phone and transmits history information stored in the memory 212 to the smart phone. The programs stored in the memory 212 may be stored in the memory 212 through either wired or wireless communication with the external device via the input/output interface 213, or may be read from a medium to be stored in the memory 212.

Figure 7:
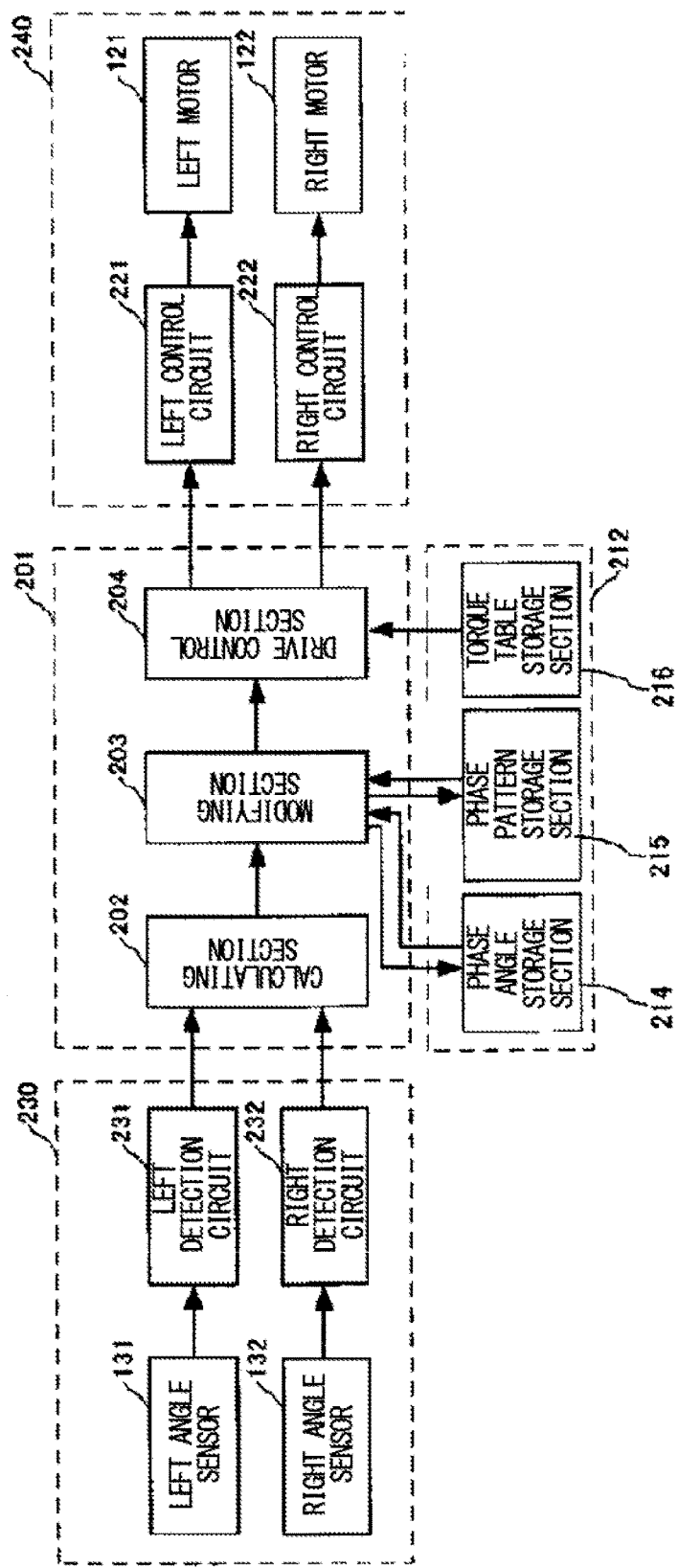
FIG. 7 is a function block diagram for describing each process relating to the phase correction.

The following describes the process for acquiring the assist torque P, which is the target value for the auxiliary force, using a function block diagram and specific signal waveforms. FIG. 7 is a function block diagram for describing each process relating to the phase correction. FIGS. 8A to 8F are views for describing changes in the signal waveforms.

Figure 8A:
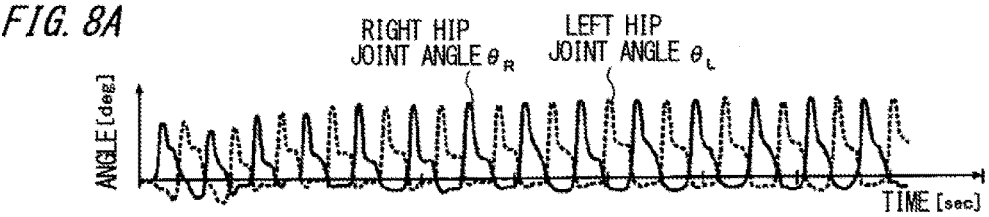
FIGS. 8A to 8F are views for describing changes in the signal waveforms.

In the manner described above, the output signal output from the left angle sensor 131 is converted by the left detection circuit 231 into the left hip joint angle $\theta_L$ and the left hip joint angular speed $\omega_L$ of the left thigh 901 per unit time, and then transmitted to the system control section 201. In the same manner, the output signal output from the right angle sensor 132 is converted by the right detection circuit 232 into the right hip joint angle $\theta_R$ and the right hip joint angular speed $\omega_R$ of the right thigh 902 per unit time, and then transmitted to the system control section 201. In other words, the left angle sensor 131, the left detection circuit 231, the right angle sensor 132, and the right detection circuit 232 function as a detecting section 230 that detects the hip joint angle θ and the hip joint angular speed ω of the user 900. FIG. 8A shows signal waveforms of the right hip joint angle $\theta_R$ and the left hip joint angle $\theta_L$. The vertical axis indicates the angle [deg] and the horizontal axis indicates time [sec]. Each of the following processes performed on these signals is performed by the system control section 201, and each process performed by the system control section 201 is described sequentially as a function block.

Figure 8B:
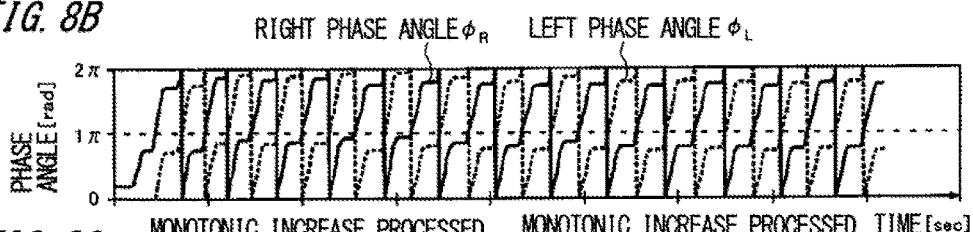

FIG. 8B shows signal waveforms of the right phase angle $φ_R$ and the left phase angle $φ_L$. The vertical axis indicates the phase angle [rad] and the horizontal axis indicates time [sec]. The calculating section 202 determines whether the movement of the user 900 is the curvature movement or the extension movement. When the hip joint angle θ is positive, the calculating section 202 determines that the movement of the user 900 is the curvature movement, and calculates the corrected phase angle φ using Expression 2. On the other hand, when the hip joint angle θ is negative, the calculating section 202 determines that the movement of the user 900 is the extension movement, and calculates the corrected phase angle φ using Expression 3. The calculating section 202 provides a modifying section 203 with the calculated phase angle φ.

Figure 8C:
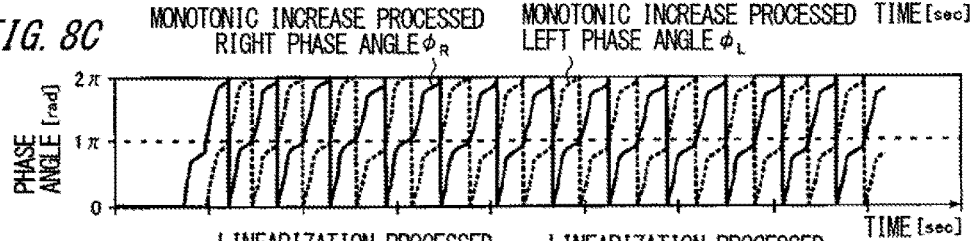

The modifying section 203 modifies the phase angle φ acquired from the calculating section 202. FIG. 8C shows signal waveforms of the left phase angle $φ_L$ and the right phase angle $φ_R$ after a monotonic increase process. The vertical axis indicates the phase angle [rad] and the horizontal indicates time [sec]. The modifying section 203 performs a monotonic increase process on the phase angle, as the modification of the phase angle φ. The modifying section 203 modifies the phase angle such that the phase angle φ gradually increases relative to the step period. The modifying section 203 stores the modified phase angle φ in a phase angle storage section 214 of the memory 212. The specific content of the monotonic increase process performed on the phase angle φ by the modifying section 203 is described further below.

Furthermore, the modifying section 203 performs a phase pattern learning process as the modification of the phase angle φ. A phase pattern indicating change over time of the phase angle and formed by the phase angle φ of one period obtained from the previous pattern learning process is stored in a phase pattern storage section 215 of the memory 212. The modifying section 203 references this phase pattern in the memory 212, and modifies the phase pattern formed by the phase angle φ of one newly acquired period. The memory 212 updates the phase pattern stored in the phase pattern storage section 215 based on the phase pattern modified by the modifying section 203. The specific details of the phase pattern learning process performed by the modifying section 203 are described further below.

Figure 8D:
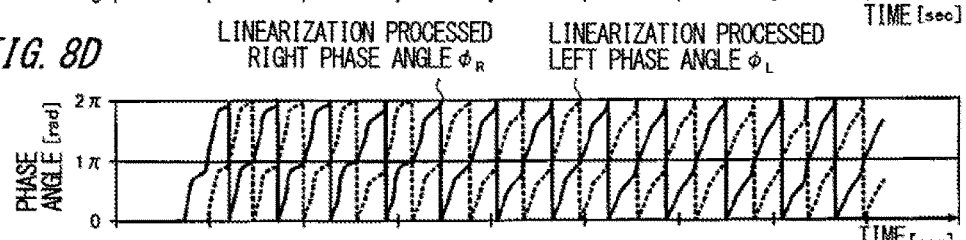

FIG. 8D shows signal waveforms of the left phase angle $\varphi_L$ after a linearization process and the right phase angle $\varphi_R$ after a linearization process. The vertical axis indicates the phase angle [rad] and the horizontal axis indicates time [sec]. The modifying section 203 modifies the phase angle $\varphi$ in a staged manner in each step period based on a predetermined phase change pattern, such that the phase pattern of the phase angle $\varphi$ relative to the passage of time in a step period approaches a straight line, according to the repetition of the step movement, as the modification of the phase angle $\varphi$. Here, the phase pattern obtained from the phase pattern learning process is one example of a predetermined phase change pattern. The modifying section 203 performs the linearization process in each step period, using the phase pattern obtained from the phase pattern learning process and the phase angle $\varphi$ after the monotonic increase process. As a result of the modifying section 203 performing the linearization process in each step period in this manner, the phase angle $\varphi_R$ after the linearization process and the phase angle $\varphi_L$ after the linearization process each approach a linear change with the passage of time, as can be seen in FIG. 8. The specific details of the linearization process performed by the modifying section 203 are described further below.

Figure 8E:
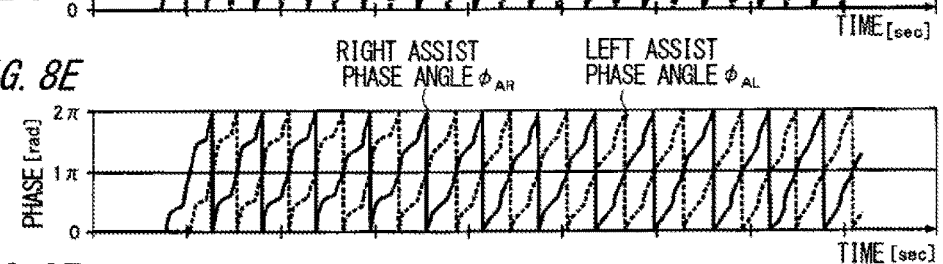

FIG. 8E shows signal waveforms of a left assist phase angle $\varphi_{AL}$ and a right assist phase angle $\varphi_{AR}$. The vertical axis indicates the phase angle [rad] and the horizontal axis indicates time [sec]. The modifying section 203 calculates the assist phase angle $\varphi_A$ by adding or subtracting a fixed value from the phase angle $\varphi$ resulting from the linearization process. For example, the modifying section 203 subtracts a fixed value from the phase angle $\varphi$ resulting from the linearization process. In this way, the modifying section 203 can change phase angle $\varphi$ resulting from the linearization process such that the phase angle becomes smaller overall. As another example, the modifying section 203 adds a fixed value to the phase angle $\varphi$ resulting from the linearization process. In this way, the modifying section 203 can change the phase angle $\varphi$ resulting from the linearization process such that the phase angle becomes larger overall. The modifying section 203 may set the fixed value to be 0, so that the phase angle $\varphi$ resulting from the linearization process is used as-is as the assist phase angle $\varphi_A$. The modifying section 203 provides the drive control section 204 with the converted assist phase angle $\varphi_A$.

Figure 8F:
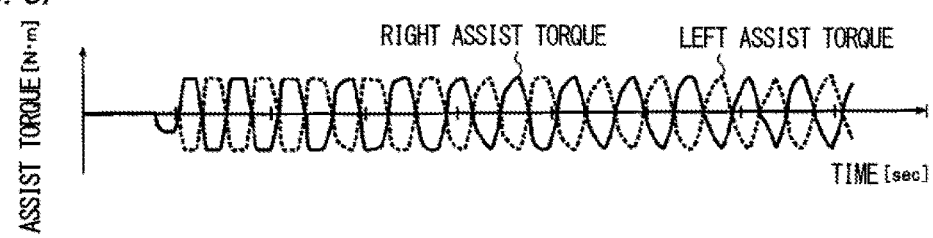

FIG. 8F shows signal waveforms of a left assist torque $P_L$ and a right assist torque $P_R$. The vertical axis indicates torque [N·m] and the horizontal axis indicates time [sec]. Upon acquiring the left assist phase angle $\varphi_{AL}$ and the right assist phase angle $\varphi_{AR}$ from the modifying section 203, the drive control section 204 references a torque table stored in a torque table storage section 216 of the memory 212 and acquire the assist torque $P_L$ corresponding to the left assist phase angle $\varphi_{AL}$ and the assist torque $P_R$ corresponding to the right assist phase angle $\varphi_{AR}$.

In the torque table, the left assist torque $P_L$ values are associated respectively with the possible values for the left assist phase angle $\varphi_{AL}$. Also in the torque table, the right assist torque $P_R$ values are associated respectively with the possible values for the right assist phase angle $\varphi_{AR}$. In other words, the torque table is a lookup table in which the assist phase angle $\varphi_A$ is associated with the assist torque P.

The drive control section 204 provides the left control circuit 221 with the acquired left assist torque $P_L$ at a timing for generating the assist torque, such that the left motor 121 is driven to provide the auxiliary force to the user 900. Furthermore, the drive control section 204 provides the right control circuit 222 with the acquired right assist torque $P_R$ at a timing for generating the assist torque, such that the right motor 122 is driven to provide the auxiliary force to the user 900. In this way, the left control circuit 221 and left motor 121 and the right control circuit 222 and right motor 122 function as a providing section 240 that provides the auxiliary force to the periodic step movement of the user 900.

In this way, the system control section 201 calculates the phase angle $\varphi$ using the calculating section 202 and applies the monotonic increase process, the pattern learning process, and the linearization process to the calculated phase angle $\varphi$ using the modifying section 203, thereby modifying the phase angle $\varphi$ in a manner to change linearly with respect to the step period. The drive control section 204 acquires the assist torque P corresponding to the phase angle $\varphi$ that changes linearly relative to the step period. In this way, the step assist device 100 of the present embodiment can provide the user 900 with an auxiliary force based on this assist torque P.

In the process described using FIG. 7 and FIGS. 8A to 8F, upon acquiring the hip joint angle $\theta$ and the hip joint angular speed $\omega$ from the detecting section 230, the system control section 201 causes the calculating section 202 to sequentially calculate the phase angle $\varphi$ using the hip joint angle $\theta$ and the hip joint angular speed $\omega$. Upon acquiring the phase angle $\varphi$ from the calculating section 202, the modifying section 203 sequentially modifies the phase angle $\varphi$ by performing the monotonic increase process, the pattern learning process, and the linearization process. Upon acquiring the assist phase angle $\varphi_A$ from the modifying section 203, the drive control section 204 sequentially acquires the assist torque P and outputs the acquired assist torque P to the left control circuit 221 or the right control circuit 222. In this way, by sequentially performing all of these processes, the step assist device 100 can provide the user 900 with an auxiliary force that is quickly able to adapt to the gait of the user 900. Here, the term "sequentially" means that in a case where the calculating section 202 acquires the hip joint angle $\theta$ and the hip joint angular speed $\omega$ every 10 milliseconds from the detecting section 230, the calculating section 202 calculates the phase angle $\varphi$ in real time every 10 milliseconds, which is the acquisition interval. In the same manner, in the case of the modifying section 203, the term "sequentially" means that if the modifying section 203 acquires the phase angle $\varphi$ every 10 milliseconds from the calculating section 202, the modifying section 203 modifies the phase angle $\varphi$ in real time every 10 milliseconds, which is the acquisition interval.

Figure 9:
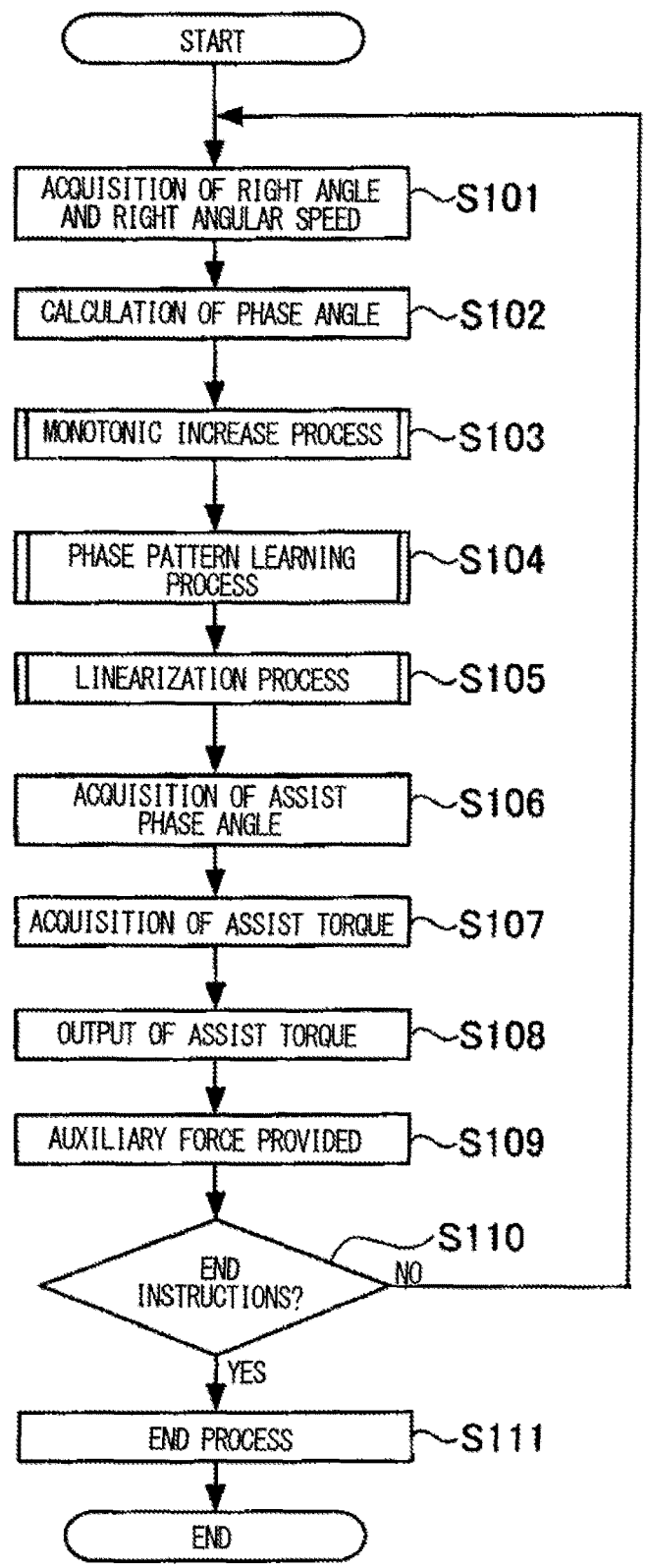
FIG. 9 is a flow chart showing the flow of the process for providing the user with the auxiliary force.

The following describers the process for providing the user 900 with the auxiliary force, in the form of a series of processing steps. FIG. 9 is a flow chart showing the flow of the process for providing the user 900 with the auxiliary force. In the following description, signal waveforms of the left leg and the right leg are shown in the drawing, but in a case where the same process is performed for both the left leg and the right leg, the process for acquiring the assist torque P of the left motor 121 is described and the process for acquiring the assist torque P of the right motor 122 is omitted. The flow shown in FIG. 9 begins at the point when the activation switch 101 is pressed by the user 900 and the system control section 201 has read the control program from the memory 212 and completed the initialization process.

The system control section 201 causes the left angle sensor 131 and the left detection circuit 231 to function and acquire the left hip joint angle $\theta_L$ and the left hip joint angular speed $\omega_L$ (step S101). The calculating section 202 performs the phase conversion process described above and calculates the left phase angle $\varphi_L$ based on the left hip joint angle $\theta_L$ and the left hip joint angular speed $\omega_L$ (step S102). The modifying section 203 applies the monotonic increase process to the calculated left phase angle $\varphi_L$ (step S103). The monotonic increase process is described further below using FIGS. 13, 14A, and 14B.

The modifying section 203 applies the phase pattern learning process to the left phase angle $\varphi_L$ on which the monotonic increase process has been performed (step S104). The phase pattern learning process is described further below using FIGS. 15 and 16. The modifying section 203 also performs the linearization process on the left phase angle $\varphi_L$ on which the monotonic increase process has been performed, using the learned phase pattern that was created through the phase pattern learning process (S105). The linearization process is described further below using FIGS. 17A to 17D and 18.

The modifying section 203 acquires the assist phase angle $\varphi_{AL}$ by converting the left phase angle $\varphi_L$ on which the linearization process has been performed (step S106), and outputs the assist phase angle $\varphi_L$ to the drive control section 204. For example, the modifying section 203 adds or subtracts a fixed value to or from the left phase angle $\varphi_L$ on which the linearization process has been performed and the right phase angle $\varphi_R$ on which the linearization process has been performed, such that the right assist phase angle $\varphi_{AR}$ and the left assist phase angle $\varphi_{AL}$ respectively become a predetermined right assist phase angle $\varphi_{AR}$ and left assist phase angle $\varphi_{AL}$.

Figure 10A:
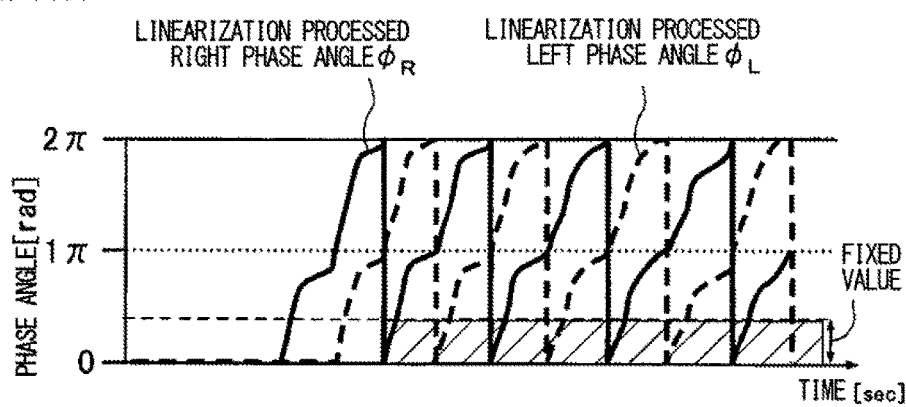
FIGS. 10A and 10B are views for describing signal waveforms when calculating the assist phase angle.
Figure 10B:
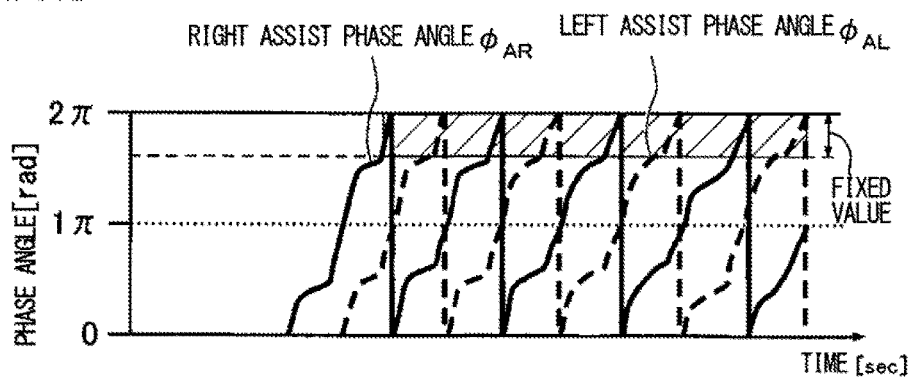

FIGS. 10A and 10B are views for describing signal waveforms when calculating the assist phase angle $\varphi_A$. FIGS. 10A and 10B are used to describe an example in which a fixed value is subtracted from the phase angle $\varphi$ on which the linearization process has been performed, to acquire the assist phase angle $\varphi_A$ converted such that the phase angle becomes smaller overall than the phase angle $\varphi$ on which the linearization process has been performed.

FIG. 10A shows signal waveforms of the phase angle on which the linearization process has been performed. In FIG. 10A, the vertical axis indicates the phase angle [rad] and the horizontal axis indicates time [sec]. The modifying section 203 subtracts a fixed value from the phase angle $\varphi$ on which the linearization process has been performed. If the result of the fixed value subtraction is that the phase angle $\varphi$ has a value less than 0, the modifying section 203 links to the immediately prior phase period, as a phase angle $\varphi$ obtained by subtracting this less-than-zero value from $2\pi$. On the other hand, if the result of the fixed subtraction is that the phase angle $\varphi$ has a value greater than 0, the modifying section 203 sets this phase angle $\varphi$ resulting from the fixed value subtraction in the current phase period. The portion of the signal waveforms below the dashed line in FIG. 10A is a region in which the phase angle $\varphi$ is less than 0 as a result of the fixed value subtraction. Accordingly, the portion of the signal waveforms contained in this region are added to the top, in a manner to be continuous with the phase angle $\varphi$ of the immediately prior phase period. On the other hand, the portion of the signal waveforms above the dashed line in FIG. 10A is a region in which the phase angle $\varphi$ is greater than 0 as a result of the fixed value subtraction. Accordingly, the signal waveforms contained in this region are shifted downward. The left assist phase angle $\varphi_{AL}$ and the right assist phase angle $\varphi_{AR}$ created through the conversion described above are shown in FIG. 10B.

FIG. 10B shows signal waveforms of the left assist phase angle $\varphi_{AL}$ and the right assist phase angle $\varphi_{AR}$. In FIG. 10B, the vertical axis indicates the phase angle [rad] and the horizontal indicates time [sec]. In this way, the modifying section 203 can shift all of the phase angles toward smaller angles, by subtracting the fixed value from the phase angle $\varphi$ on which the linearization has been performed. FIG. 10B shows an example in which the same fixed value is subtracted from both the left phase angle $\varphi_L$ and the right phase angle $\varphi_R$, but the subtracted fixed values may be different based on the respective phase periods of the left phase angle $\varphi_L$ and the right phase angle $\varphi_R$. In this way, the phase difference between the left assist phase angle $\varphi_{AL}$ and the right assist phase angle $\varphi_{AR}$ can be adjusted.

Figure 11:
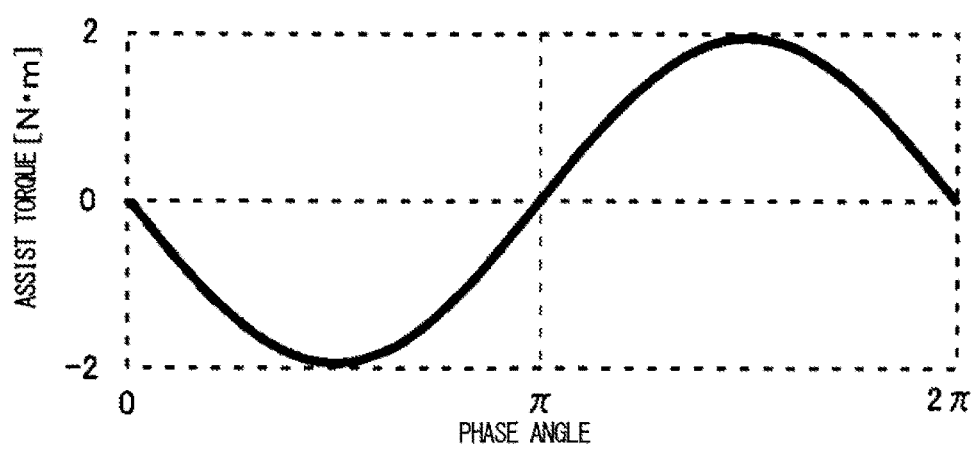
FIG. 11 shows examples of signal waveforms obtained by continuously connecting the torque values corresponding to the assist phase angle.
Figure 12:
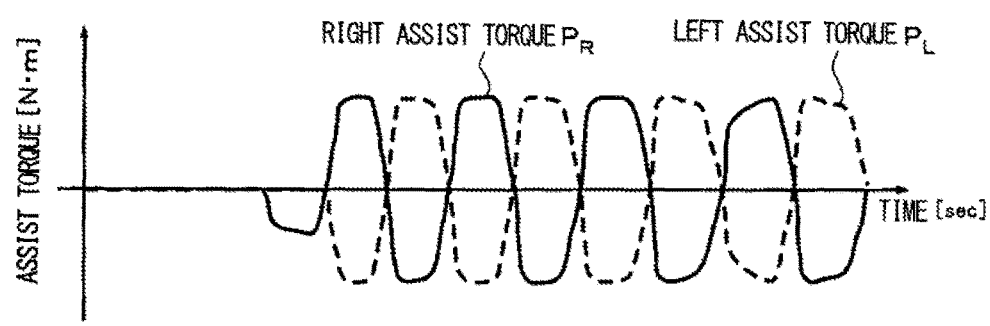
FIG. 12 shows an example of the assist torque P.

After step S106 shown in FIG. 9, the drive control section 204 acquires the assist torque corresponding to the assist phase angle $\varphi_A$ (step S107). FIG. 11 shows examples of signal waveforms obtained by continuously connecting the torque values corresponding to the assist phase angle, and FIG. 12 shows an example of the assist torque P. In the present embodiment, the torque table associates the assist torque P with the assist phase angle $\varphi_A$ such that the assist torque P is $-2 \sin \varphi_A$ for an assist phase angle $\varphi_A$ from 0 to $2\pi$. The drive control section 204 references the torque table stored in the torque table storage section 216 to acquire the left assist torque $P_L$ corresponding to the left assist phase angle $\varphi_{AL}$ such as shown in FIG. 12. The drive control section 204 can then provide the user 900 with the auxiliary force corresponding to the left assist torque $P_L$ from the left motor 121, by providing the left control circuit 221 with the acquired left assist torque $P_L$. Instead of being provided with the torque table, the torque table storage section 216 may store Expression 4 as a function, and in this case, the drive control section 204 calculates the assist torque P from Expression 4 and the assist phase angle $\varphi_A$.

$$\text{assist torque } P = -2 \sin \varphi_A \qquad \text{Expression 4:}$$

After step S107 in FIG. 9, the drive control section 204 outputs the acquired left assist torque $P_L$ to the left control circuit 221 and outputs the acquired right assist torque $P_R$ to the right control circuit 222 (step S108). The left control circuit 221 drives the left motor 121 to provide the user 900 with the auxiliary force corresponding to the left assist torque $P_L$. In the same manner, the right control circuit 222 drives the right motor 122 to provide the user 900 with the auxiliary force corresponding to the right assist torque $P_R$ (step S109).

The system control section 201 determines whether end instructions have been received from the user 900 (step S110). Specifically, the system control section 201 detects whether the activation switch 101 has been pressed again. The subject performing the pressing is not limited to the user 900, and may be someone assisting the user 900.

If it is determined that end instructions have not been received (step S110: No), the system control section 201 returns to the process of step S101 and repeats the series of processes. If it is determined that end instructions have been received (step S110: Yes), the system control section 201 proceeds to the process of step S111.

The system control section 201 performs the end process at step S111. For example, as the end process, the system control section 201 deletes the learned phase patterns stored in the phase pattern storage section 215 and the phase angles φ on which the monotonic increase process has been performed stored in the phase angle storage section 214 of the memory 212. The system control section 201 ends the series of processes when the end process is completed, and stops the supply of power from the battery 102. If the same user 900 is to use the step assist device 100 in succession, a setting may be performed so that the learned phase patterns stored in the phase pattern storage section 215 and the phase angles φ on which the monotonic increase process has been performed stored in the phase angle storage section 214 of the memory 212 are not deleted. In this way, the step assist device 100 can provide the user 900 with the auxiliary force that quickly adapts to the gait of the user 900.

Figure 13:
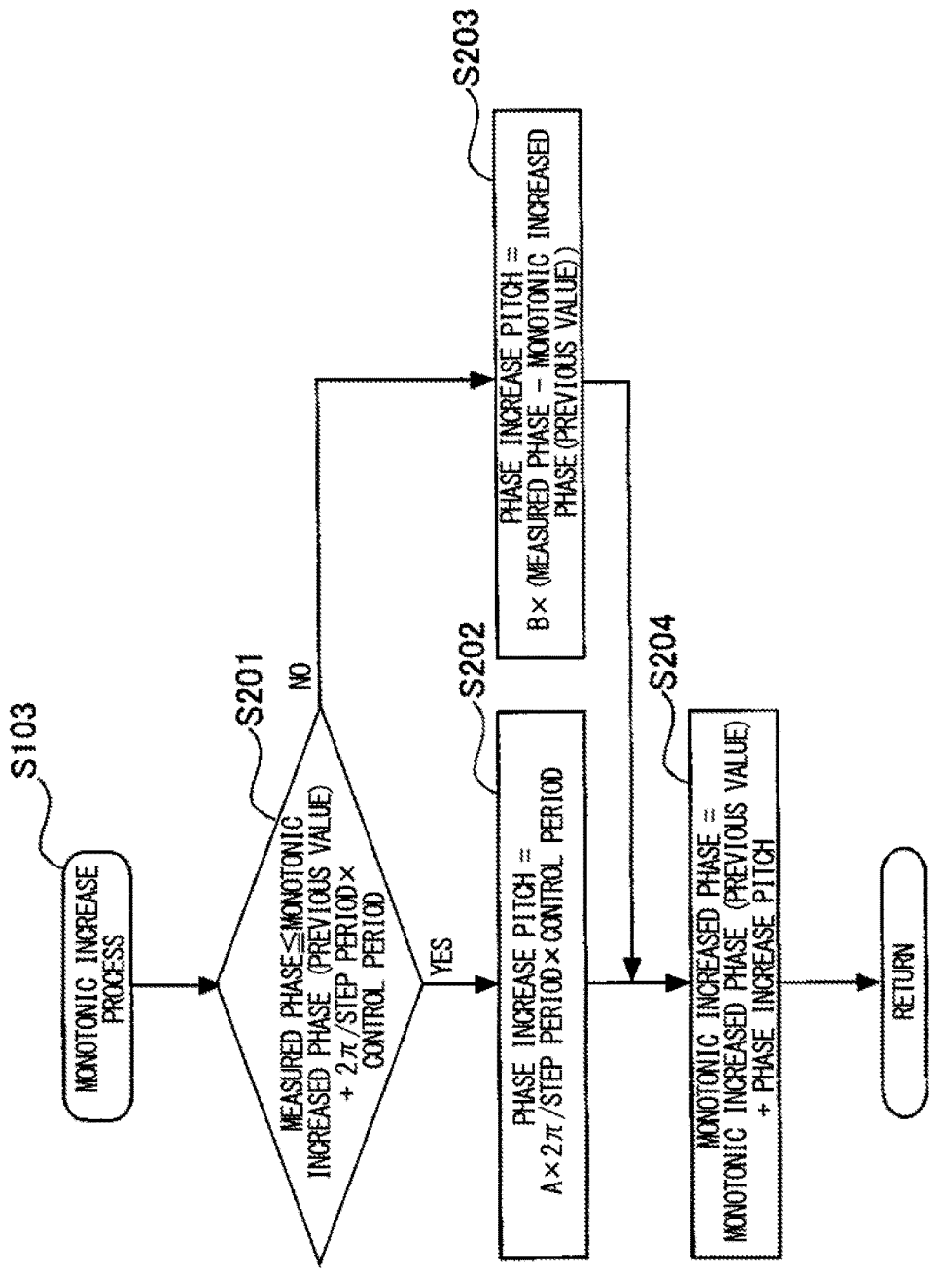
FIG. 13 shows a detailed sub-flow of the monotonic increase process.
Figure 14A:
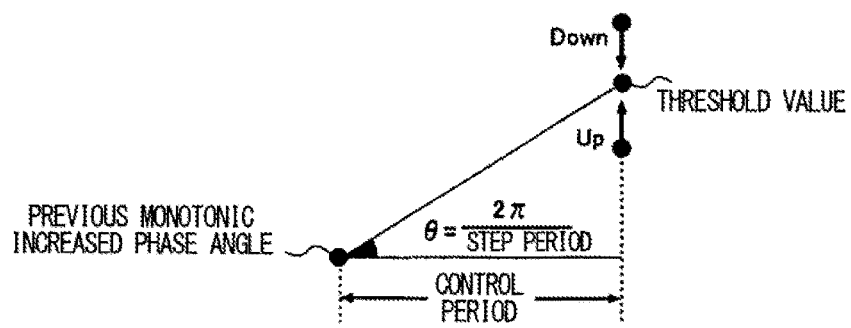
FIGS. 14A and 14B are views for describing the signal waveforms of the phase angle on which the monotonic increase process has been performed.
Figure 14B:
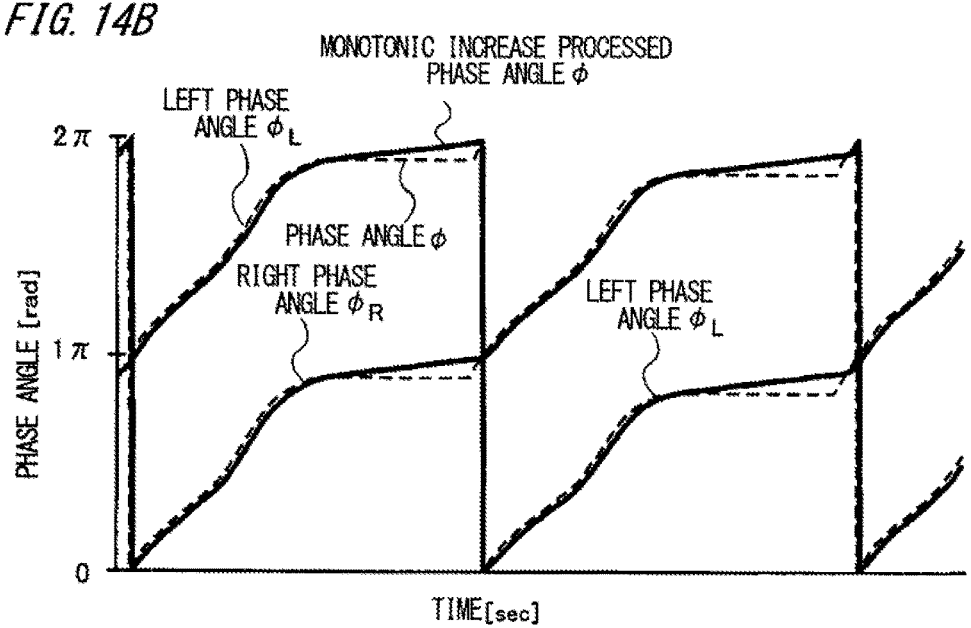

FIG. 13 shows a detailed sub-flow of the monotonic increase process performed at step S103 in FIG. 9. FIGS. 14A and 14B are views for describing the signal waveforms of the phase angle φ on which the monotonic increase process has been performed. FIGS. 13, 14A, and 14B are used to describe an example of the monotonic increase process performed by the modifying section 203. The modifying section 203 performing the monotonic increase process functions as a second phase angle modifying section, and so there are cases where the phase angle φ on which the monotonic increase process has been performed is referred to as a second modified phase angle.

Upon receiving the phase angle φ from the calculating section 202, the modifying section 203 determines whether the acquired phase angle φ is less than or equal to a threshold value (S201). This threshold value is a value obtained by adding together the previous monotonic increase phase angle and a reference increase amount of a predetermined unit time from the step period of the previous phase angle φ, and can be calculated as shown in Expression 5 below.

threshold value=monotonic increase phase angle(previous value)+2π/step period×control period  Expression 5:

Here, the step period is the previous step period that includes the curvature movement and the extension movement. The control period is the time unit until the output of a new phase angle φ by the calculating section 202. If it is determined that the phase angle φ is less than or equal to the threshold value (step S201: Yes), the modifying section 203 sets the phase increase pitch according to Expression 6, based on the reference increase amount in the predetermined unit time from the step period of the previous phase angle φ (step S202).

phase increase pitch=A×2π/step period×control period  Expression 6:

Here, A is a desired positive constant.

On the other hand, if the phase angle φ is determined to not be less than or equal to the threshold value (step S201: No), the modifying section 203 sets the phase increase pitch according to Expression 7, based on the difference between the previous monotonic increase phase angle and the phase angle φ (step S203).

phase increase pitch=B×(phase angle φ−previous monotonic increase phase angle)  Expression 7:

Here, B is a desired positive constant.

The modifying section 203 adds the phase increase pitch set at step S202 or step S203 to the phase angle φ (step S204). The modifying section 203 stores the phase angle φ to which the phase increase pitch has been added in the phase angle storage section 214, and returns to the main process flow. In this way, the modifying section 203 modifies the phase angle φ by determining different increase values according to whether the phase angle φ calculated by the calculating section 202 is greater than the threshold value and adding the resulting increase value to the phase angle φ. The phase angle φ on which the monotonic increase process has been performed stored in the phase angle storage section 214 is used in the phase pattern learning process, the linearization process, and the subsequent monotonic increase process.

FIG. 14A shows the basics of the monotonic increase process. In FIG. 14A, the threshold value is the value shown by Expression 5. In other words, in the monotonic increase process, the determination as to whether the phase increase pitch calculated according to Expression 6 is used or the phase increase pitch calculated according to Expression 7 is used is made by taking the previous phase angle φ value on which the monotonic increase process has been performed and determining whether the measured phase angle φ is less than the straight line obtained in a case where the phase angle φ changes linearly from 0 to 2π relative to the previous step period. If the measured phase angle φ is smaller than this straight line, the phase increase pitch calculated according to Expression 6 is set, and if the measured phase angle φ is larger than this straight line, the phase increase pitch calculated according to Expression 7 is set. By adding the set monotonic increase pitch to the phase angle φ, the modifying section 203 can modify the phase angle φ in a manner to approach the straight line obtained when the phase angle φ changes linearly from 0 to 2π relative to the step period.

Furthermore, by setting the constant A and the constant B in Expression 6 and Expression 7 to be large values, the modifying section 203 performs modification that causes the phase angle φ to change suddenly, thereby causing the phase angle φ to rapidly change linearly from 0 to 2π relative to the step period. On the other hand, by setting the constant A and the constant B to be small values, the modifying section 203 causes the phase angle φ to faithfully match the actual gait of the user 900, without significantly modifying the phase angle φ.

FIG. 14B shows signal waveforms before the monotonic increase process is performed and signal waveforms after the monotonic increase process has been performed. In FIG. 14B, the vertical axis indicates the phase angle φ [rad], the horizontal axis indicates time [sec], the solid lines indicate the signal waveforms of the right phase angle $φ_R$ and the left phase angle $φ_L$ before the monotonic increase process, and the dashed lines indicate the signal waveforms of the right phase angle $φ_R$ and the left phase angle $φ_L$ after the monotonic increase process. As shown in FIG. 14B, when the phase angle φ increases suddenly, the modifying section 203 can ameliorate this sudden increase in the phase angle φ by adding a negative phase increase pitch. Furthermore, when the phase angle φ is slow to change, the modifying section 203 increases the phase angle φ by adding a positive phase increase pitch. The phase angle φ after the monotonic increase process has been performed is modified to change more linearly with respect to the step period than the phase angle φ before the monotonic increase process is performed. The step assist device 100 can assist with the walking of the user 900 by providing smooth and ideal torque, by assisting with the steps of the user 900 based on a torque corresponding to the phase angle φ that changes linearly with respect to the step period in this manner.

As another method for performing the monotonic increase process, in a case where the difference between the previous phase angle φ and the measured phase angle φ is less than or equal to a prescribed threshold value, the modifying section 203 may determine that the phase angle φ is slow to change and modify the phase angle φ by adding a preset increase amount to the previous phase angle φ. Furthermore, in a case where the difference between the previous phase angle φ and the measured phase angle φ is greater than or equal to a prescribed threshold value, the modifying section 203 may determine that the phase angle φ is increasing suddenly and modify the phase angle φ by correcting the difference between the previous phase angle φ and the measured phase angle φ.

Figure 15:
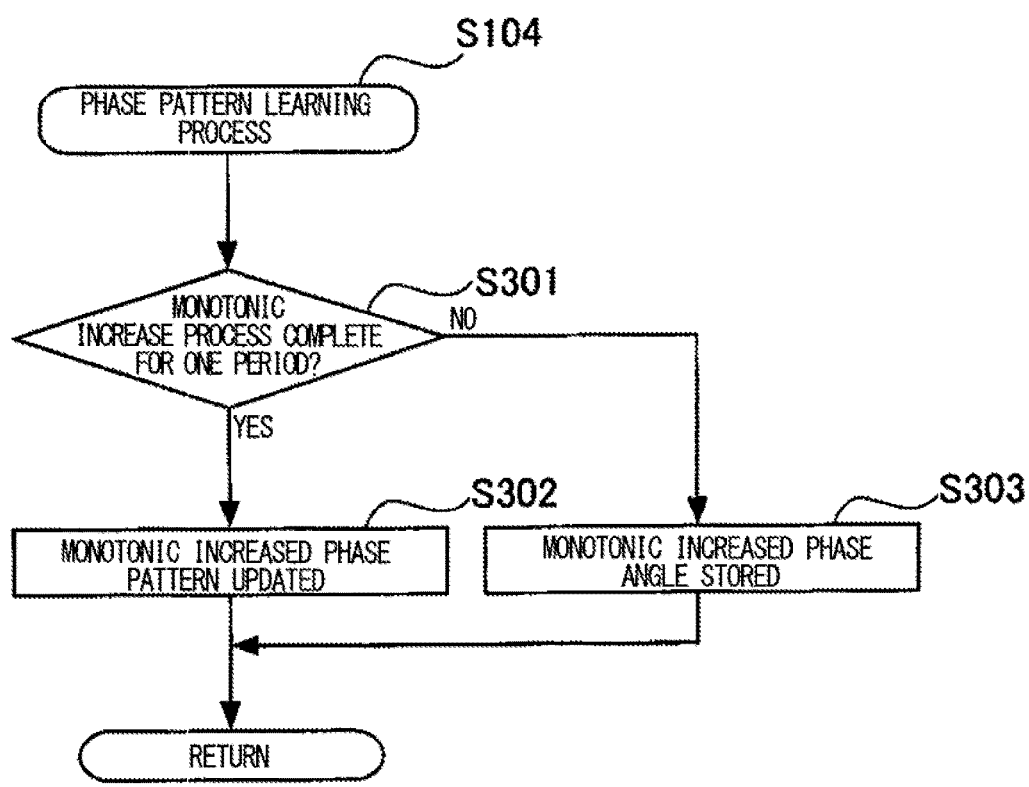
FIG. 15 shows a sub-flow in the phase pattern learning process.
Figure 16:
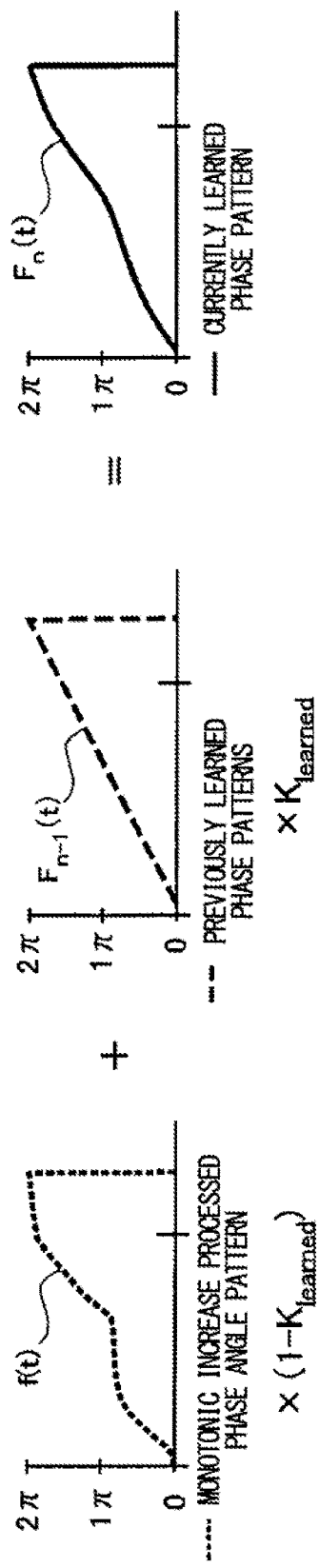
FIG. 16 is a view for describing the phase pattern learning process.

FIG. 15 shows a sub-flow in the phase pattern learning process of step S104 shown in FIG. 9. FIG. 16 is a view for describing the phase pattern learning process. FIGS. 15 and 16 are used to describe an example of the phase pattern learning process performed by the modifying section 203. The modifying section 203 performing the phase pattern learning process functions as a first phase angle modifying section, and therefore the phase angle φ on which the phase pattern learning process has been performed may be referred to as a first modified phase angle.

First, the modifying section 203 determines whether the monotonic increase process has been completed for one period (step S301). If the phase angle φ acquired from the calculating section 202 is 2π, the modifying section 203 determines that the monotonic increase process has been completed for one period (step S301: Yes), and then performs the phase pattern learning process by calculating a signal waveform by multiplying the phase angle φ on which the monotonic increase process of the one period has been performed by $(1-K_{learned})$. Furthermore, the modifying section 203 reads the previous learned phase pattern from the phase pattern storage section 215 and calculates the signal waveform by multiplying the phase angles φ of each of the learned phase patterns up to the previous learned phase pattern by $K_{learned}$. The modifying section 203 adds together the signal waveform calculated through the multiplication by $(1-K_{learned})$ and the signal waveform calculated through the multiplication by $K_{learned}$, to perform a weighted averaging process on the currently measured phase pattern and all previous learned phase patterns. Here, $K_{learned}$ is a desired constant included in a range of $0<K_{learned}<1$. The modifying section 203 updates the previous learned phase patterns stored in the phase pattern storage section 215 to include the currently calculated and learned phase pattern (step S302), and returns to the main process flow.

On the other hand, if the phase angle φ acquired from the calculating section 202 is not 2π, the modifying section 203 determines that the monotonic increase process is not completed for one period (step S301: No). In this case, the modifying section stores the phase angle φ on which the monotonic increase process has been performed in the phase angle storage section 214 (step S303), and returns to the main process flow.

In FIG. 16, the phase pattern of the phase angle φ on which one period of the monotonic increase process has been performed is $f_n(t)$, and the previously learned phase patterns are $F_{(n-1)}(t)$. In this case, the currently learned phase pattern F(n) is calculated as shown in Expression 8 below.

$$F(n)=(1-K_{learned}) \times f_n(t)+K_{learned} \times F_{(n-1)}(t) \qquad \text{Expression 8:}$$

The learned phase pattern calculated using Expression 8 is stored in the phase pattern storage section 215 and used in the linearization process and the subsequent phase pattern learning process.

The modifying section 203 modifies the phase patterns stored in the phase pattern storage section 215 by performing normalization to remove variations of the periods in the step movements. For example, the modifying section 203 performs normalization with the step periods in the learned patterns calculated using Expression 8 being dimensionless values from 0 to 1. Instead of the modifying section 203, the phase pattern storage section 215 may have a function to perform a normalization to remove variation in the periods of the step movements.

When normalization is performed with the step period of the learned phase patterns being a dimensionless value from 0 to 1, the modifying section 203 performs the phase pattern learning process by generating a learned phase pattern obtained by distributing the step period of the phase angle φ on which the monotonic increase process has been performed to the normalized values in the learned phase patterns. Instead of this, the modifying section 203 may perform the phase pattern learning process by performing normalization with the step period of the phase angle φ on which the monotonic increase has been performed being a dimensionless value from 0 to 1. In this way, by normalizing the step period, even when the step period of the phase pattern on which the monotonic increase process has been performed differs from the step period of the learned phase patterns, the modifying section 203 can perform the phase pattern learning process.

In the phase pattern learning process, the previously learned phase patterns can be weighted more heavily when the arbitrary constant $K_{learned}$ is larger, and the currently measured phase pattern can be weighted more heavily when $K_{learned}$ is smaller. In other words, in a case where the step assist device 100 is used by a user 900 who is prone to sudden disturbances when walking, such as a patient with an injured leg or an elderly person, $K_{learned}$ can be set to a large value to decrease the effect of the sudden disturbances in walking on the learned phase pattern. Furthermore, when the user 900 is a healthy person who rarely experiences sudden disturbances when walking, $K_{learned}$ can be set to a small value to quickly reflect the current gait of the user 900 in the learned phase pattern.

FIGS. 17A to 17D are views for describing changes in signal waveforms when performing the linearization process. First, a detailed example of the linearization process is described using FIGS. 17A to 17D.

Figure 17A:
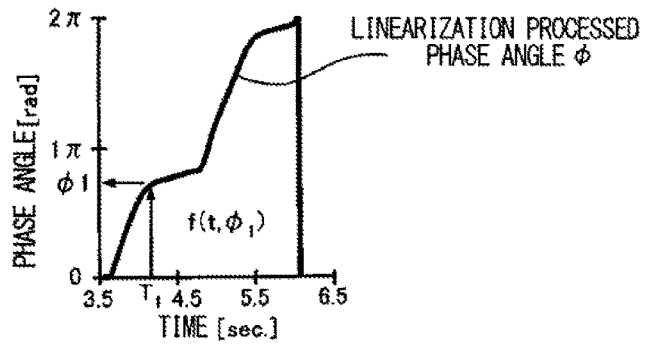
FIGS. 17A to 17D are views for describing changes in signal waveforms when performing the linearization process.

FIG. 17A shows a signal waveform of the phase angle φ after the monotonic increase process. In FIG. 17A, the vertical axis indicates the phase angle [rad] and the horizontal axis indicates time [sec]. The linearization process is described using the point $(T_1, φ_1)$ in the signal waveform shown in FIG. 17A as an example.

Figure 17B:
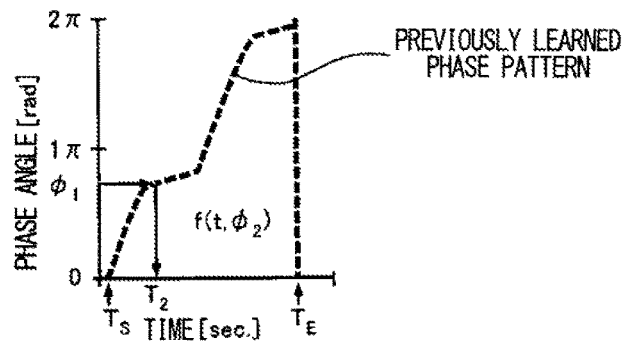

FIG. 17B shows the previous learned phase pattern. In FIG. 17B, the vertical axis indicates the phase angle [rad] and the horizontal axis is dimensionless in a case where the normalization process has been performed, but for ease of explanation in FIGS. 17A to 17D and 18, the horizontal axis indicates time [sec]. The modifying section 203 references the previous learned phase pattern shown in FIG. 17B, and acquires the time $T_2$ corresponding to the phase angle $φ_1$.

Figure 17C:
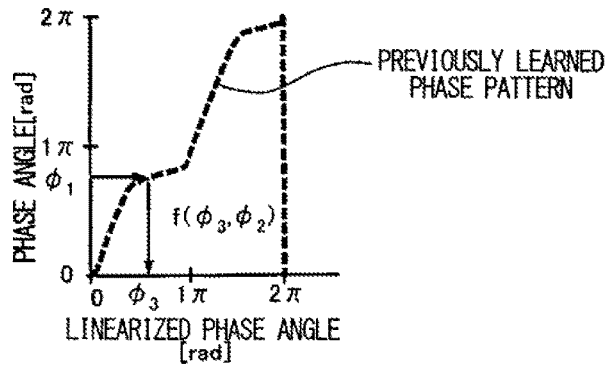

FIG. 17C shows a signal waveform obtained by plugging phase angles from 0 to 2π into the step period of the previous learned phase pattern. In FIG. 17C, the vertical axis indicates the phase angle [rad] and the horizontal axis also indicates the phase angle [rad]. The modifying section 203 plugs the period of the phase angle from 0 to 2π into the step period of the learned phase pattern. With the start time being $T_S$ and the end time being $T_E$ for the step period of the learned phase pattern in FIG. 17B, the modifying section 203 calculates the phase angle $φ_3$ on which the linearization process has been performed, according to Expression 9 shown below.

phase angle $\varphi_3$ after the linearization process=$2\pi \times \frac{T_2 - T_S}{T_E - T_S}$  Expression 9:

The modifying section 203 modifies the phase angle $\varphi_1$ on which the monotonic process has been performed to be the phase angle $\varphi_3$ on which the linearization process has been performed.

Figure 17D:
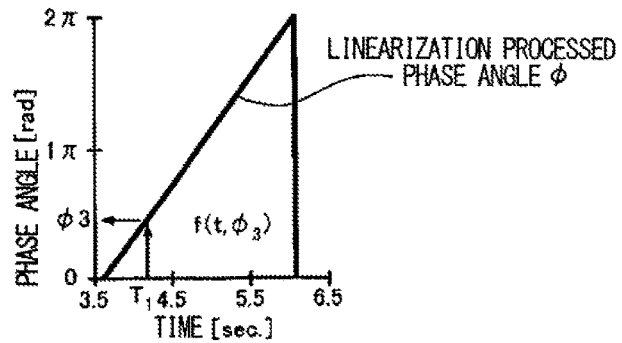

FIG. 17D shows a signal waveform obtained by plotting the phase angle $\varphi$ on which the linearization process has been performed. The linearization process performed by the modifying section 203 ends in FIG. 17C, but FIG. 17D shows the signal waveform of the values plotted according to the relationship of the calculated phase angle $\varphi_3$ on which the linearization process has been performed with respect to the phase angle and the time axis. In FIG. 17D, the vertical axis indicates the phase angle [rad] and the horizontal axis indicates time [sec]. In this way, by applying the linearization process to the phase angle $\varphi_1$ on which the monotonic increase process has been performed, the modifying section 203 can modify the phase angle $\varphi_1$ to be the phase angle $\varphi_3$ that changes linearly relative to the step period, such as shown in FIG. 17D.

Figure 18:
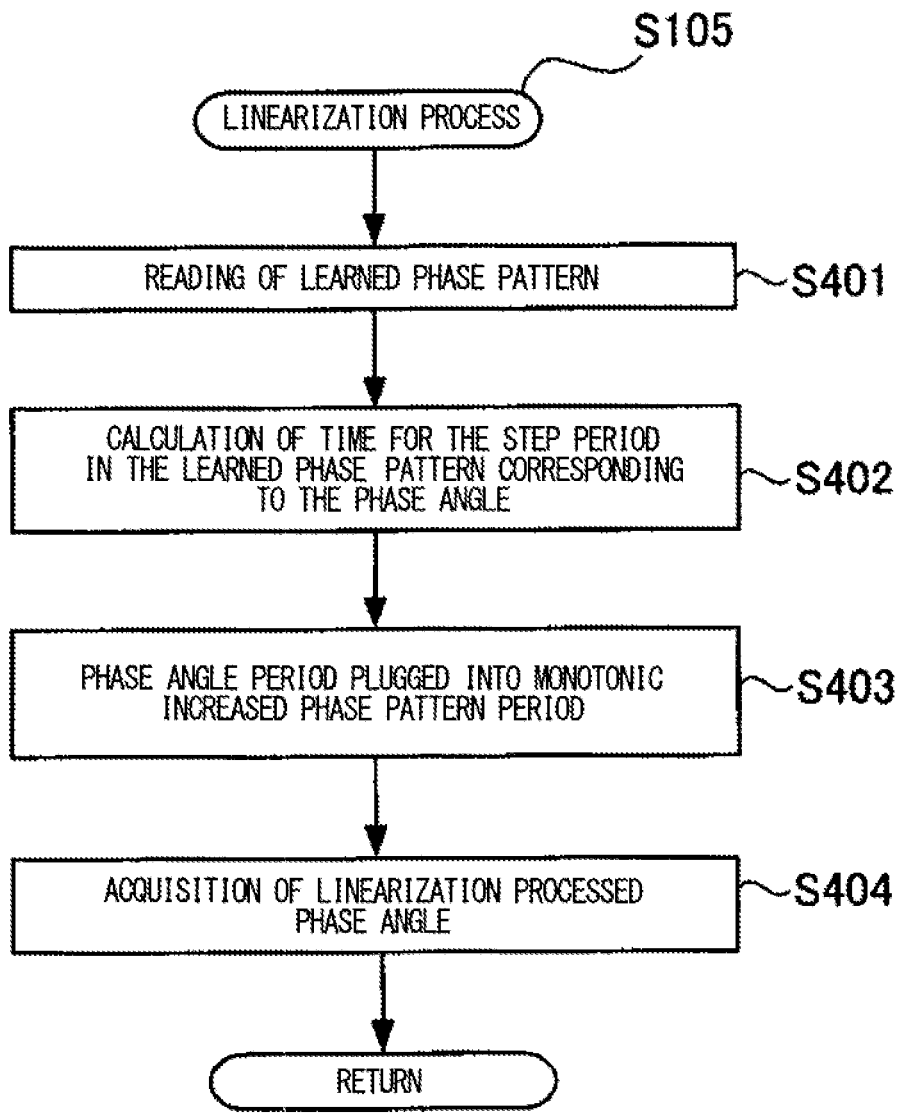
FIG. 18 shows a sub-flow in the linearization process.

FIG. 18 shows a sub-flow in the linearization process of step S105 shown in FIG. 9. FIG. 18 is used to describe the flow of the linearization process performed by the modifying section 203. The modifying section 203 performing the linearization process functions as a first phase angle modifying section, and therefore the phase angle $\varphi$ on which the linearization process has been performed is sometimes referred to as the first modified phase angle.

The modifying section 203 reads the previous learned phase pattern from the phase pattern storage section 215 (step S401). The modifying section 203 calculates the time corresponding to the step period of the learned phase pattern that corresponds to the phase angle $\varphi$ on which the monotonic increase process has been performed (step S402). This process is the process of acquiring $T_2$ from the phase angle $\varphi_1$ in the example of FIGS. 17A to 17D.

The modifying section 203 plugs the phase angle period from 0 to $2\pi$ into the step period of the learned phase pattern (step S403). This process is the process for setting the step period from $T_S$ to $T_E$ as the phase period from 0 to $2\pi$ in the example of FIGS. 17A to 17D.

The modifying section 203 acquires, as the phase angle $\varphi$ on which the linearization process has been performed, the phase angle $\varphi$ plugged in as the time of the phase period calculated in step S402 (step S404). This process is the process for using Expression 9 to calculate the phase angle $\varphi_3$ on which the linearization process has been performed in the example of FIGS. 17A to 17D. The modifying section 203 modifies the phase angle $\varphi$ on which the monotonic increase process has been performed to be the phase angle $\varphi$ on which the linearization process has been performed, and returns to the main process flow.

The modifying section 203 applies the linearization process by performing a map conversion as described above. In the linearization process described above, as shown in FIGS. 17A and 17B, when the slope of the signal waveform of the phase angle $\varphi$ on which the linearization process has been performed is the same as the slope of the signal waveform of the learned phase pattern, even if the signal waveform of the phase angle $\varphi$ is a curve, the phase angle $\varphi$ is adjusted such that the phase angle $\varphi$ changes linearly with respect to the step period. The drive control section 204 acquires, from the torque table, the assist torque P that corresponds to the phase angle $\varphi$ changing linearly with respect to the step period in this manner, and provides the assist torque P to the providing section 240. In this way the providing section 240 can assist the steps of the user 900 with an even smoother ideal torque.

As described above, by performing the monotonic increase process, the phase pattern learning process, and/or the linearization process, the step assist device 100 of the present embodiment modifies the phase angle $\varphi$ to change linearly with respect to the step period. As a result, disturbances in the change of the phase angle $\varphi$ relative to the step period can be restricted. Furthermore, by assisting the steps of the user 900 based on the torque corresponding to the phase angle $\varphi$ that changes linearly with respect to the step period in this manner, the step assist device 100 can assist the steps of the user 900 with smooth ideal torque.

The step assist device 100 according to the present embodiment calculates the phase angle $\varphi$ determined from the hip joint angle $\theta$ and the hip joint angular speed $\omega$, and can acquire the assist torque P from this phase angle $\varphi$ and the predetermined torque table. In this way, the control parameters can be reduced compared to the control parameters for control using a phase oscillator, and the assist torque P can be acquired using a simple calculation.

The present embodiment shows an example in which the hip joint angular speed $\omega$ is calculated using the left detection circuit 231 and the right detection circuit 232. However, the hip joint angular speed $\omega$ may be acquired from the hip joint angle $\theta$ using a Hilbert transform circuit.

The present embodiment describes an example using the phase angle $\varphi$ determined from the hip joint angle $\theta$ and the hip joint angular speed $\omega$. However, the phase angle $\varphi$ is not limited to this, and may instead be determined from the hip joint angle $\theta$ and the acceleration of the hip joint angle or from the hip joint angular speed $\omega$ and the hip joint acceleration, for example.

The present embodiment describes an example in which the phase pattern learning process is performed in order to create a learned phase pattern to be used in the linearization process. However, the assist torque P may be acquired using the phase angle $\varphi$ to which the phase pattern learning process has been applied. Furthermore, the monotonic increase process, the phase pattern learning process, and the linearization process performed by the modifying section 203 may each be performed independently, or may be combined in any manner. When the monotonic increase process is performed independently, the second phase angle modifying section that performs the monotonic increase process inputs the second modified phase angle to the first phase angle modifying section. The first phase angle modifying section may calculate the assist phase angle $\varphi_A$ from the acquired second modified phase angle and output the assist phase angle $\varphi_A$ to the drive control section 204.

The present embodiment describes an example in which the linearization process is performed using the previous learned phase pattern. However, when the linearization process is performed independently, a test pattern measured through experimentation in advance may be stored in the phase pattern storage section 215, and the modifying section 203 may perform the linearization process on the phase angle $\varphi$ using this phase pattern. In this case, other examples of predetermined phase change patterns are patterns measured in advance through experimentation.

The monotonic increase process is a process to modify the phase angle $\varphi$ to change gradually while maintaining the gait of the user 900. The phase pattern learning process is a process to reduce the effect of sudden changes in the gait of the user 900. The linearization process is a process to modify the phase angle $\varphi$ to change linearly regardless of the gait of the user 900. By performing these processes in combination, the phase angle φ can be modified while combining the effects of each process. The modified phase angle φ is then applied to the torque table to acquire the assist torque P, which is provided to the user 900. In this way, it is possible to precisely adapt to the assistance content desired by the user 900. Furthermore, the manipulating section 211 can be used to perform setting such that some of these processes are performed while others are not.

In the case of a user 900 who has a problem with their right leg or left leg such that their left and right symmetry is unbalanced during the step movement, the step assist device 100 can be used for rehabilitation that improves the right and left leg symmetry during the step movement. In the usual case when the step movement has right and left symmetry, the difference in the phase angle between the left leg and the right leg is π. Accordingly, the modifying section 203 can improve the right and left symmetry of the step movement of the right leg by using Expression 10 shown below.

right assist phase angle $\varphi_{AR}$=right phase angle
$\varphi_R$-fixed value-$K$×(π-(right phase angle
$\varphi_R$-left phase angle $\varphi_L$))  Expression 10:

Here, K is a constant determined according to how strongly the left and right symmetry is to be improved.

The assist torque P' corresponding to the right phase angle $\varphi_R$' shifted relative to the right phase angle $\varphi_R$ corresponding to the step movement of the user 900 provides a negative load to the right leg of the user 900 during the kicking movement instead of providing an assisting auxiliary force that assists in the kicking movement, for example. Accordingly, by providing the user 900 with the assist torque $P_R$' corresponding to the phase-shifted right phase angle $\varphi_R$', the step assist device 100 can modify the step movement of the right leg of the user 900 to match the right phase angle $\varphi_R$'.

In Expression 10, with $\varphi_K$ (representing the phase angle obtained by multiplying the amount by which the phase angle difference between the right and left legs is shifted from π by K, when the left and right leg symmetry is not π, the modifying section 203 subtracts the phase angle $\varphi_K$ from the right leg phase angle $\varphi_R$. In this way, the modifying section 203 determines the right assist phase angle $\varphi_{AR}$ that is shifted by the phase angle $\varphi_K$ (from the right phase angle $\varphi_R$. On the other hand, in a case where the user 900 is assumed to be walking with ideal left and right symmetry, the value of the term (right phase angle $\varphi_R$-left phase angle $\varphi_L$) in Expression 10 becomes π and the term K×(π-(right phase angle $\varphi_R$-left phase angle $\varphi_L$)) becomes 0, and so the modifying section 203 does not modify the right phase angle $\varphi_R$. In this way, by providing the user 900 with the assist torque $P_R$ corresponding to the right assist phase angle $\varphi_{AR}$ shifted by the phase angle $\varphi_K$, the left and right symmetry in the step movement of the user 900 can be improved. The expression for improving right and left symmetry for the step movement of the left foot is the same as Expression 10, and therefore further description is omitted.

The present embodiment described above focuses on an example in which the monotonic increase process, the phase pattern learning process, and the linearization process are performed in order. However, simply by performing torque control according to the auxiliary force target value for the phase angle defined by including at least one of the hip joint angle and the hip joint angular speed, a positive effect is achieved that is not seen in the conventional art. In other words, compared to a model using a phase oscillator, it is possible to perform effective rehabilitation even for an assisted walker who has a small step width and only a small difference between the left and right hip joint angles. In this case, the step assist device includes a providing section that provides auxiliary force to the step movement of the user, a detecting section that detects the hip joint angle and the hip joint angular speed of the user, a calculating section that calculates the phase angle determined by the hip joint angle and the hip joint angular speed for a period of the step movement, and a control section that acquires the target value for the auxiliary force determined in advance for the phase angle and controls the providing section according to the target value.

Furthermore, the step assist device described above includes a modifying section that modifies the phase angle, and the control section acquires the target value for the phase angle modified by the modifying section.

A step control program for controlling a step control device causes a computer to perform a detection step of detecting the hip joint angle and the hip joint angular speed of the user, a calculation step of calculating the phase angle determined by the hip joint angle and the hip joint angular speed for a period of the step movement of the user, an acquisition step of acquiring a target value, which is set in advance for the phase angle, for the auxiliary force of the providing section that provides the auxiliary force to the step movement, and a control step of controlling the providing section according to the target value.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

100: step assist device, 101: activation switch, 102: battery, 103: waist frame, 104: waist belt, 121: left motor, 122: right motor, 131: left angle sensor, 132: right angle sensor, 141: left thigh frame, 142: right thigh frame, 151: left thigh belt, 152: right thigh belt, 201: system control section, 202: calculating section, 203: modifying section, 204: drive control section, 211: manipulating section, 212: memory, 213: input/output interface, 214: phase angle storage section, 215: phase pattern storage section, 216: torque table storage section, 221: left control circuit, 222: right control circuit, 230: detecting section, 231: left detection circuit, 232: right detection circuit, 240: providing section, 900: user, 901: left thigh, 902: right thigh, 910: upper body

What is claimed is:
1. A step assist device comprising:
   a providing section that provides auxiliary force to a periodic step movement of a user;
   a processor configured to control movement of the providing section; and a detecting section that detects at least one of a hip joint angle and a hip joint angular speed of the user, wherein the processor is further configured to:
- calculate a phase angle defined relative to periodic movement of a hip joint of the user, based on a detection result of the detecting section,
- according to repetition of the step movement, modify in a staged manner the phase angle input thereto, based on a predetermined phase change pattern, such that a phase pattern of the phase angle approaches a straight line relative to the passage of time, and output the modified phase angle as a first modified phase angle, and
- acquire a target value based on a continuous change pattern of the auxiliary force set in advance for one of the first modified phase angle and a prescribed phase angle, and control the providing section according to the target value.

2. The step assist device according to claim 1, wherein the processor is further configured to determine an increase value that differs according to whether the calculated phase angle is greater than a value obtained by adding together a previous instance of the phase angle and a reference increase amount per unit time determined from a period of the step movement, modify the previous phase angle by adding the increase value to the previous phase angle, and output the modified phase angle as a second modified phase angle.

3. The step assist device according to claim 2, wherein the processor is further configured to determine the increase value based on a difference between the calculated phase angle and the previous phase angle if the calculated phase angle is greater than the value obtained by adding together the previous phase angle and the reference increase amount per unit time determined from the period of the step movement, and determine the increase value based on the reference increase amount if the calculated phase angle is not greater than the value obtained by adding together the previous phase angle and the reference increase amount per unit time determined from the period of the step movement.

4. The step assist device according to claim 2, comprising:
a storage section that sequentially stores change over time in one period of a past instance of the second modified phase angle, wherein
the processor is further configured to modify the input phase angle based on the change over time of the past second modified phase angle stored in the storage section, and output the resulting modified phase angle as a first modified phase angle.

5. The step assist device according to claim 4, wherein the storage section stores, as a new change over time in one period of a past second modified phase angle, change over time of a current instance of the second modified phase angle and change over time of the phase angle acquired by performing a weighted averaging process on the phase angles at corresponding times among the change over time in the one period of the past second modified phase angle stored in the storage section.

6. The step assist device according to claim 4, wherein the processor is further configured to identify a corresponding time when the input phase angle is plugged into change over time in the one period of the past second modified phase angle stored in the storage section, and output the phase angle of the corresponding time for the period of the step movement as the first modified phase angle.

7. The step assist device according to claim 4, wherein the storage section modifies the change over time in the one period of the past second modified phase angle stored in the storage section, by performing normalization to remove variation of the period of the step movement.

8. The step assist device according to claim 1, wherein the providing section includes a left actuator that provides the auxiliary force to the left leg of the user and a right actuator that provides the auxiliary force to the right leg of the user,
the detecting section includes a left angle sensor that detects a left hip joint angle of the user and a right angle sensor that detects a right hip joint angle of the user, and
the processor is further configured to control the left actuator based on output of the left angle sensor and control the right actuator based on output of the right angle sensor.

9. The step assist device according to claim 8, wherein the processor is configured to modify the phase angle based on a difference between a phase angle of a left leg and a phase angle of a right leg during the step movement.

10. A computer-readable medium storing thereon a step count program that, when executed by a computer, causes the computer to:
- detect at least one of a hip joint angle and a hip joint angular speed of a user;
- calculate a phase angle defined relative to periodic movement of a hip joint of the user, based on a detection result of the detecting;
- according to repetition of a step movement, modify in a stepped manner an input phase angle input, based on a predetermined phase change parameter, such that a phase pattern of the phase angle approaches a straight line relative to the passage of time, and output the modified phase angle as a first modified phase angle, and
- acquire a target value for an auxiliary force of a providing section that provides the auxiliary force for the step movement, based on a continuous change pattern of the auxiliary force set in advance for one of the first modified phase angle and a prescribed phase angle; and
- control the providing section according to the target value.

* * * * *